United States Patent

Spencer

[15] 3,662,340

[45] May 9, 1972

[54] DATA COMPARISON SYSTEM FOR LISTING VERIFICATION OF MULTIPLE DIGIT DATA WORDS

[72] Inventor: David R. Spencer, Waltham, Mass.

[73] Assignee: EG & G, Inc., Bedford, Mass.

[22] Filed: July 25, 1969

[21] Appl. No.: 844,973

[52] U.S. Cl. ....................340/146.2, 235/61.7 R, 340/149 A, 340/174.1 C

[51] Int. Cl. ..........................................................G06f 7/22

[58] Field of Search ....................340/146.2, 149 A, 174.1 C, 340/173; 274/9, 17, 1, 15; 235/61.7 B

[56] References Cited

UNITED STATES PATENTS

| | | | |
|---|---|---|---|
| 2,952,464 | 9/1960 | Stimler | 274/15 |
| 2,953,383 | 9/1960 | Walters | 274/15 |
| 3,184,714 | 5/1965 | Brown, Jr. et al. | 340/149 |
| 3,314,057 | 4/1967 | Mogtader | 340/174.1 |
| 3,258,750 | 6/1966 | Shew | 340/174.1 |
| 3,337,852 | 8/1967 | Lee et al. | 340/174.1 X |
| 3,404,259 | 10/1968 | Atkinson, Jr. et al. | 340/149 X |
| 3,449,734 | 6/1969 | Frey et al. | 340/174.1 |
| 3,511,509 | 5/1970 | Firestone | 274/9 |
| 3,513,441 | 5/1970 | Schwend | 340/149 |
| 3,530,280 | 9/1970 | Goldman | 235/61.7 |

*Primary Examiner*—Charles E. Atkinson
*Attorney*—Ralph L. Cadwallader and Kenway, Jenney & Hildreth

[57] ABSTRACT

A data comparison system incorporating a phonographic recording system which includes a phonograph disk on which is recorded a train of signals representing a sequence of digital words. There is included a keyboard on which a data entry can be registered and the phonograph includes means for positioning the arm of the phonograph adjacent to that portion of the record disk in which a digital word corresponding to the data entry would be recorded. The digital words are recorded on the record in an order of $2^N$ groups of words, with the N least significant bits of each of the words in the group being identical and with a specific order within the group of the words. A circuitry is provided to check the entered word against the digital sequence produced from the group identified by the same N least significant bits, thereby enabling the system to provide an output indication as to whether the word is listed.

19 Claims, 21 Drawing Figures

INVENTOR.
DAVID R. SPENCER
BY Ralph L. Cadwallader
Kenway, Jenney & Hildreth
ATTORNEYS CP=CURRENT POSITION OF STYLUS
DP=DESIRED POSITION OF STYLUS
CAL=CALIBRATION CYCLE
ARM=STYLUS ARM
ARM MOTOR=ARM UP/DOWN MOTOR CTRL
DRIVE=ARM POS. MOTOR POWER CTRL
DA=DISK DATA ADDRESS
KA=KEYBOARD ADDRESS
DW=DISK DATA WORD (10 DIGIT NUMBER)
KW=KEYBOARD WORD
CONTINUITY=TURNTABLE ACCESS COVER INTERLOCK SWITCH
HOME=ARM CLEAR OF DISK FOR DISK CHANGING (≅−128)
TURNTABLE=TURNTABLE MOTOR POWER
0=FIRST GROOVE
+128=CENTER GROOVE
+255=LAST GROOVE

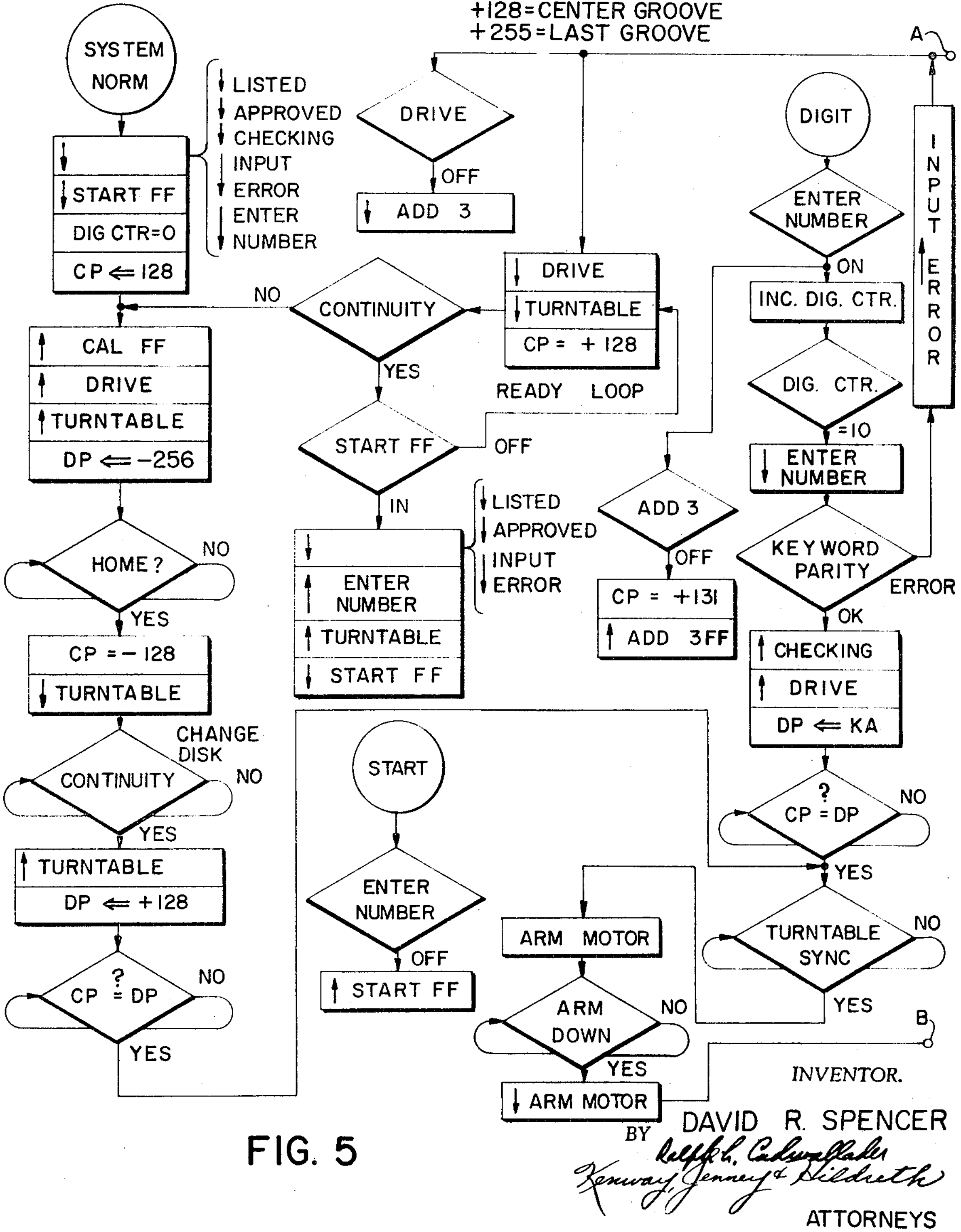

FIG. 5

INVENTOR.
DAVID R. SPENCER
BY Ralph L. Cadwallader
Kenway, Jenney & Hildreth
ATTORNEYS INVENTOR.
DAVID R. SPENCER
BY [signature]
Kenway, Jenney & Hildreth
ATTORNEYS INVENTOR
DAVID R. SPENCER
BY Ralph L. Cadwallader
Kenway, Jenney & Hildreth
ATTORNEYS

INVENTOR
DAVID R. SPENCER
BY
ATTORNEYS

INVENTOR
DAVID R. SPENCER
BY Ralph L. Cadwallader
Kenway, Jenney & Hildreth
ATTORNEYS INVENTOR
DAVID R. SPENCER
BY [signature]
ATTORNEYS

INVENTOR

DAVID R. SPENCER

BY Ralph L. Cadwallader

Kenway, Jenney & Hildreth

ATTORNEYS

INVENTOR.
DAVID R. SPENCER
BY Ralph L. Cadwallader
Kenway, Jenney & Hildreth
ATTORNEYS INVENTOR
DAVID R. SPENCER
BY [signature]
[signature]
ATTORNEYS

DATA COMPARISON SYSTEM FOR LISTING VERIFICATION OF MULTIPLE DIGIT DATA WORDS

SUMMARY OF THE INVENTION

My invention relates to data processing apparatus, and particularly to a novel comparator for checking a data entry against a recorded list of data entries to determine whether or not it has previously been recorded.

Modern data processing apparatus has been developed that greatly facilitates counting, inventory control and other operations that require a large number of predetermined computations. In general, however, such apparatus is not particularly useful to those who require a small amount of information at relatively infrequent intervals, because of the economical use of such apparatus requires that its operating time in preparing the desired information should be significant relative to the time required to set it into operation and obtain the desired results. A particular problem that has not been previously deemed amenable to solution by data processing techniques has been presented by the widespread and growing use of credit cards. In most instances such cards are accepted as satisfactory evidence of the holders' right to charge purchases to the account represented by the card, because otherwise they would have very little utility. However, it is not uncommon for credit cards to be lost or stolen, and subsequently misused. To limit the losses from that cause, the numbers of cards subject to such misappropriation are listed by the company issuing the cards, and such lists are furnished from time to time to those retailers to whom the cards might be presented. However, it is manifestly impractical for a salesman to compare each card as it is presented with a long list of unacceptable account numbers, both because of the delay to the customer and the problem that the salesman's time required would bulk large in comparison with the amount that might be saved by discovering an unacceptable card.

The object of my invention is to facilitate the checking of data entries such as credit card account numbers against a recorded list of entries, such as a list of unacceptable account numbers, so rapidly and economically that it can be made a routine part of the precess of recording a purchase to be charged against a card.

Briefly, the objects of my invention are attained by a novel comparator system incorporating a phonograph adapted to accept a conventional phonographic disk on which there is recorded a list of data entries, such as a list of unacceptable credit card account numbers. The apparatus is provided with a data entry device such as a card reader or a keyboard on which data entries such as an account number can be entered, whereupon the phonograph arm will be set to a position on the disk slightly ahead of the location where the entered number would be recorded if it had been recorded. After the arm has been put in position, control of the system is turned over to apparatus that responds to the information recorded on the disk, first to obtain synchronization with the disk data, and then to compare it with the registered entry until it has been determined that it is either present or that the location on which it would have been recorded has been passed. If the entry has been recorded, an indication that it has will be produced, and if it has not been recorded a second indication will be produced. Since the phonographic disks employed are relatively inexpensive and can be quickly prepared, a given disk can be replaced by a later disk at frequent intervals so that the information on it will always be relatively up to date. Additionally, phonograph disks can be replicated very inexpensively so that the same list may be distributed inexpensively to a large number of comparator stations. With data disks having a few hundred thousand credit card listings carried thereon, a determination of whether a particular entered number is listed can be made in less than 5 seconds. As will appear, the apparatus is arranged so that any data processing error that may occur will not result in an indication that the data entered has been recorded, but will either ignore the error or produce an indication that the data has not been recorded. That arrangement has the advantages that complex and precise apparatus necessary to insure against all errors is unnecessary, and that, in the particular application of credit card checking, the embarassment and loss of good will that would result from a false indication that the card should not be honored would be prevented.

The manner in which I prefer to construct the apparatus of my invention, and its mode of operation, will best be understood in the light of the following detailed description, together with the accompanying drawings, of a preferred embodiment thereof.

In the drawings:

FIGS. 5 and 6 are portions of a functional flow diagram illustrating the logical operation of the verifying system of this invention;

DESCRIPTION OF PREFERRED EMBODIMENTS

Figure 1:
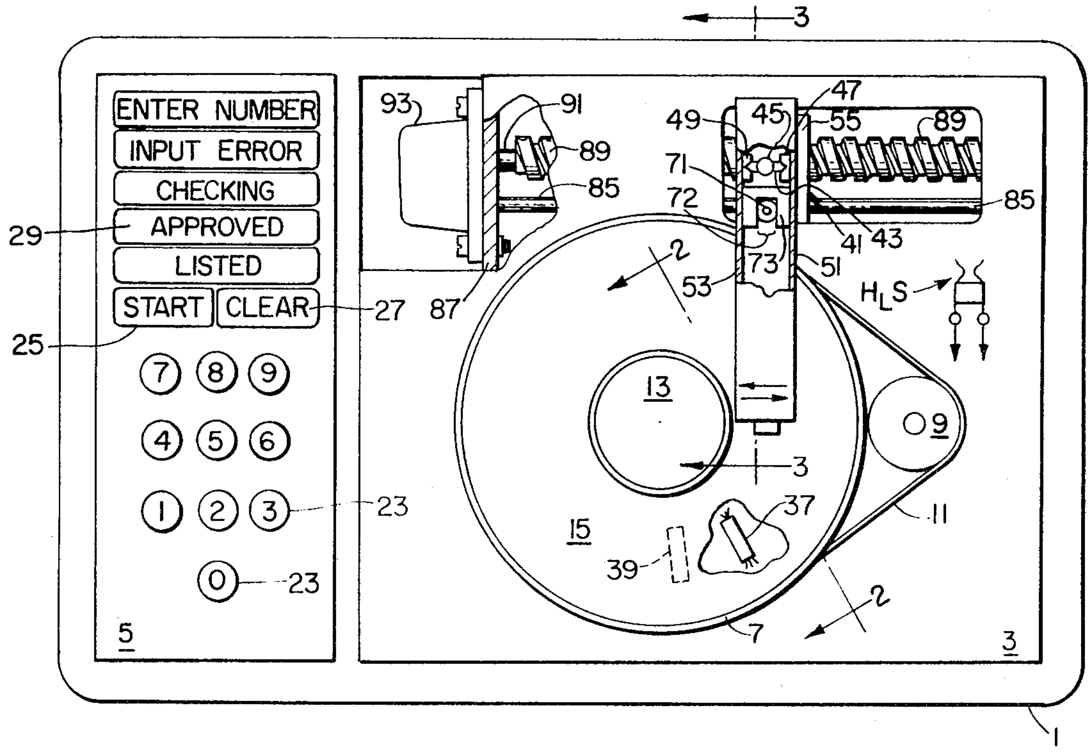
FIG. 1 is a schematic plan view, with parts shown in cross-section and parts broken away, of a phonographic credit verifying system in accordance with my invention.

Referring first to FIG. 1, a data verifying system in accordance with my invention comprises a case generally designated 1 in which there is mounted a turntable support plate 3 and a keyboard 5. On the turntable support plate 3 is rotatably mounted a turntable 7 arranged to be driven by a pulley 9 through a belt 11. A center post 13 forming a part of the turntable registers a phonographic recording disk 15 in position to be carried by the turntable beneath a reproducing arm 17 upon which a conventional phonographic cartridge 19 carrying a stylus 21 is mounted (see FIG. 3).

On the keyboard 5 are mounted ten digit pushbuttons 23 each labeled with a different one of the digits 0 through 9 for entering a number to be verified into the system. Also mounted on the keyboard 5 are a START pushbutton 25, CLEAR pushbutton 27, and five labeled translucent panels 29 bearing the indicia ENTER NUMBER, INPUT ERROR, CHECKING, APPROVED and LISTED. Lamps are mounted behind each of these panels, so that when one of them is lit the corresponding inscribed indication is visually presented to the user.

Generally speaking, and in terms of the apparatus just described, when the ENTER NUMBER panel is illuminated, a ten digit number may be entered by sequentially depressing the keys 23. The arm 17 will then be driven into the vicinity of the address on which the entered number would be found if it were there recorded, unless some input error had been detected, whereupon the INPUT ERROR panel 29 would be illuminated and nothing further will occur until the CLEAR or START pushbutton is depressed.

If no input error were detected, the apparatus would proceed to lower the arm 17 into engagement with the record 15 and reproduce the information on the record until either the number entered had been discovered whereupon the LISTED panel 29 would be illuminated, or an address beyond that at which the entered number would have been stored was reached, in which case the APPROVED panel 29 would be illuminated. The details of the apparatus for performing those and other functions will be described below.

Figures 3, 4:
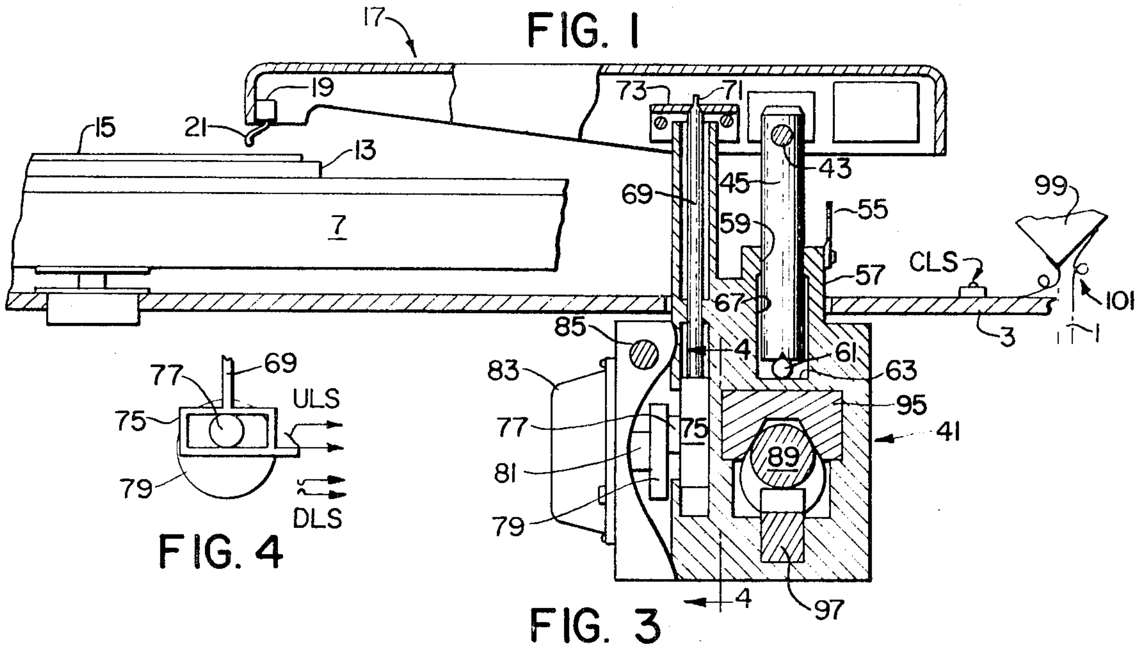
FIG. 3 is an elevational view of the apparatus of FIG. 1, with parts shown in cross-section and parts broken away, taken substantially along the lines 3—3 in FIG. 1.
FIG. 4 is a detailed view of a portion of the arm control apparatus of FIG. 3, taken substantially along the lines 4—4 in FIG. 3.
Figure 2:
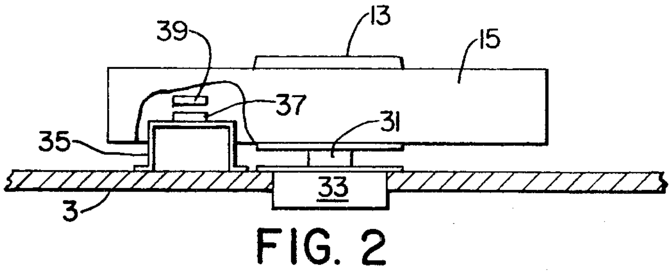
FIG. 2 is a fragmentary elevational view of the apparatus of FIG. 1, on a reduced scale, and taken essentially along the line 2—2 in FIG. 1.

Referring to FIGS. 2 and 3, the turntable 7 is supported for rotation on the support plate 3 by means of a shaft 31 fixed to the turntable 7 and journalled in a bearing assembly 33 mounted on the support plate 3. Also mounted on the support plate 3 is a bracket 35 to which a magnetic turntable synchronization switch 37 is mounted. The switch 37 is closed once during each revolution of the turntable 7 by means of a magnet 39 fixed to the bottom of the turntable 7 (FIGS. 1 and 2).

The arm 17 is mounted for translation in a direction parallel to a radius of the turntable 7 by a drive assembly generally designated 41. Referring to FIGS. 1 and 3, the arm is journalled for rotation, to move the stylus 21 into and out of engagement with the record 15 on the turntable 7, by means of a jewel bearing comprising a shaft 43 fixed transversely in an upstanding shaft 45 and engaging a pair of jewels 47 and 49 affixed to side walls 51 and 53 of the arm 17. As best shown in FIG. 3, the upward pivotal movement of the arm 17 is limited by a stop plate 55 secured to an upstanding part 57 of the drive assembly 41. The shaft 45 is supported in a guide bearing 59 formed by a bore in the drive assembly 41, and is supported against downward movement and journalled for rotation by a thrust bearing comprising a ball bearing 61 resting at the base 63 of an enlarged bore 67 formed in the drive housing 41.

In the position of the arm 17 shown, it is held at a fixed distance above the record 15 by a pin 69 at the upper end of which is conical portion terminating in a reduced pin 71. In the position shown, the conical portion between the pin portions 69 and 71 fully engages a tapered slot 72 (FIG. 1) in a bracket 73 secured to the sides 51 and 53 of the arm 17.

The pin 69 is held in the position shown in FIG. 3 when a Scotch yoke 75 is driven to the position shown by a crank pin 77 formed on a crank arm 79, and is moved downwardly so that the pin 71 is clear of the bracket 73 when the pin 77 moves down to its lower position. The crank arm 79 is driven by a crankshaft 81 comprising the output drive shaft of an arm control motor 83.

In the lower position of the crank pin 77, the pin 71 fits loosely in the slot 72 in the bracket 73, and the arm 17 is free to follow the stylus as it tracks the grooves on the record 15, for several grooves ahead of and beyond the groove that should carry the desired address, before the pin 71 again engages the slot in the bracket 73.

In practice, the lost motion thus permitted is made sufficient so that the pin 71 never engages the side of the slot 72 in normal operation. The arm drive housing 41 is supported for sliding movement by a guide rod 85 journalled in flanges such as 87 depending from and formed integral with the turntable support plate 3. The drive housing 41 is further supported and controlled in position by a worm shaft 89 journalled in a suitable bearing attached to the case 1 at the right side in FIG. 1 but not there shown, and is connected at the other end to the drive shaft 91 of an arm position control motor 93 secured to the flange 87.

The top of the shaft 89 engages a smooth guide block 95, as shown in FIG. 3. The bottom of the shaft 89 engages a drive tooth 97 that is secured to the housing 41. It will be apparent that by that arrangement, as the worm 89 is rotated in one direction or the other, the arm 17 will be translated in a direction parallel to a radius of the record 15 so that it will successively traverse the grooves recorded on the record.

As shown in FIG. 3, the case 1 is preferably provided with a cover schematically shown in fragmentary form at 99 and hinged, as suggested at 101, to the case 1. A continuity limit switch CLS is preferably mounted on the base plate 3, or in another suitable position, to be closed by the cover 99 when it is in place, and thereby producing a signal indicating that the apparatus has been put in operation and can proceed to operate without interference with the record or the arm by the operator.

THE DATA DISK

In one preferred embodiment the data disk is formed of a 7 inch phonograph record of the type used for 45 RPM operation. The disk has inscribed on it a continuous spiral track running from near the outer edge to a point perhaps halfway in on the radius of the disk. The spiral is divided into 256 equal parts called grooves with the innermost groove designated as +255 and the outermost groove as 0. The data is recorded in the grooves in a binary code. While the particular symbol format utilized will depend upon the number of bits required to be stored, one suitable symbol format is described in pending application Ser. No. 788,441, filed Jan. 2, 1969, assigned to the assignee of this application. The information is stored on the disk in the form of words, each of which is a ten digit number, which are the identifying numbers on a credit card. Each digit is stored in a binary coded decimal. These words are recorded serially, such that the highest ordered digit of each word and the highest ordered bit of each digit come off first when a recording head is moving inwardly on the disk. In this embodiment, the lowest order bit of each of the last eight digits of each word is used as the address for the number, that is, all numbers having the same lowest order bit for each of their last eight digits are stored in one groove location. It will be apparent that, since there are only eight such address bits and the words are 40 bits each, then for each address there will be a large number of possible entries. Therefore, in recording the disk, those numbers which have a common address are located on the groove assigned that address and are arranged in ascending binary sequence of the whole ten digit number. Such an arrangement provides for relatively even distribution of the numbers over the disk, if the lowest ordered bits of the various numbers are substantially randomly distributed. This provides for substantially even distribution of the numbers over the disk and therefore allows for the highest packing density of bits on the disk. This particular embodiment is useful for a large class of credit identification number distribution schemes. More generally, where the natural order of the credit card identification number distribution is not a random one, sub-sets of bits within the numbers may be selected in natural order. These bits are not necessarily contiguous. These sub-sets may be sorted in natural order and all numbers within each sub-set may also be sorted in natural order. The words and sub-sets may be ordered with either the least significant or most significant first. It will be apparent that within any addressing scheme, it is generally preferred that the address be contained within the number to be stored itself and that it have a substantially random distribution characteristic.

In addition to the data words recorded on the disk, there are two other types of signals encoded. One type of non-data word signals are fill words which are used to fill out the space in a groove for which there are no data word entries. The second type of non-data words are sync words which are used to enable the logic circuit to determine which bits are the initial bits of data words. In this embodiment there are five sync words per groove, the fill word format is entirely binary ones, and, the sync word is formed of 48 bits of which the first eight are ones and the last eight are the code 11110101.

Each of the data words, as above indicated, represent a ten digit credit card identification number. In order to provide an added security feature each of the credit card numbers are arranged in a format to provide for a mathematical parity check. In one example, the parity check may consist of performing certain computations on the numbers in the digit locations 2, 4, 6 and 8 and other operations on the numbers in the digit location FIGS. 5 and 6, combined, form a logic flow diagram for the functional operations of the data comparator system described herein. Before describing the specific logic circuits to perform these functions the entire functional operation of the device will be discussed. In general the system may be considered as performing three separate but related functions. One function is the basic data comparison function which comprises entering a number, typically from a keyboard, and looking up that number on the data disk to see if it is listed. The other two functions are both support functions for this basic purpose. One of these functions is a calibration function which has for its purpose a precise alignment of the phonograph stylus with a specific numbered groove on the data disk. This is a separate calibration step from the normal recalibration which, as will be discussed below, takes place each time a number is looked up. The third function is a sequence which presets the circuit conditions in the system when the unit is first connected to a power source. Since the system has no off-on switch, this connection to the power source initiates a sequence of checks which insure that the controlling elements are in the correct starting position, irrespective of what condition the machine was in at the time the power was removed.

Figure 6:
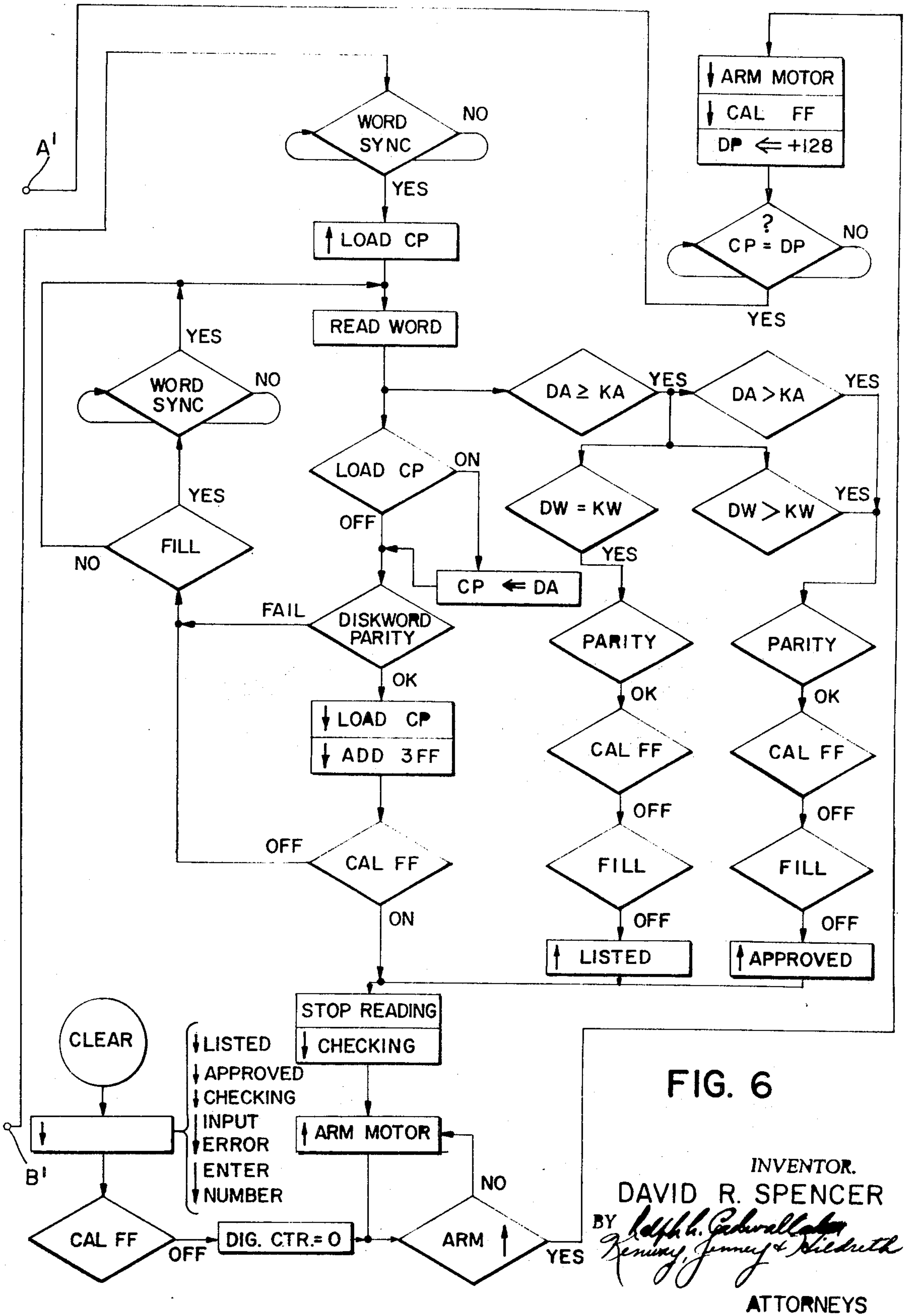

In FIGS. 5 and 6, the rectangular blocks indicate control functions, which most usually are accomplished by setting or resetting flip-flops so that the controlled condition either exists and is therefore regarded as "ON" or does not exist and is therefore regarded as "OFF." An upward directed arrow within the box indicates that the controlled element is set to its "ON" position. The diamond shaped blocks in the figures represent a functional comparison calling for a determination as to whether a specific condition exists or not and providing output answers to further elements. The circles represent manually operated control functions. In FIG. 5, a key for the abbreviations used for various functions is set forth.

The initial function to be described will be the data comparison function and it will be assumed that the unit has been calibrated and that the stylus is located precisely above groove 128, which is the center groove on the disk. The operator pushes the START button which, if the ENTER NUMBER condition is off, turns on the start flip-flop. If the ENTER NUMBER has already been actuated then the START button can perform no function. The operator now pushes the first digit number to start entering into the system the ten digit number to be looked up. Depression of the digit number will actuate this system only if the ENTER NUMBER condition is present.

The conditions which are required for the ENTER NUMBER condition to exist arise from the Ready Loop which is a self-contained loop and represents the standby condition of the system. The system is in this standby condition after it has completed looking up a number or after a calibration has been completed. The Ready Loop includes a number of specific conditions of control functions including, DRIVE control off, which turns off the power to the arm stepping motor, TURNTABLE off which turns off the turntable motor and a control function which provides that the CURRENT POSITION data register is maintained at +128. Additionally, the Ready Loop includes a determination of whether the START flip-flop is off or on and whether there is continuity present. The CONTINUITY condition is met when the cover of the device is closed so that the interlock switch is actuated. If therefore the cover is closed and the start button has not yet been pushed, the Ready Loop maintains the drive motor and the turntable motor off and the current position value at +128 on a steady standby basis. Actuation of the START button, which results in the START flip-flop being turned on, then breaks this chain of conditions and the START flip-flop determination provides an ON response. This ON response in turn guarantees that the LISTED, APPROVED and INPUT ERROR conditions are off, actuates the ENTER NUMBER control element, actuates the TURNTABLE MOTOR, and then turns off the START flip-flop.

If one of the digits is now actuated, the ENTER NUMBER condition control element is on and the actuation of that digit enters the digit and an input register increments a digit counter, which counts how many digit buttons have been pushed in succession, in order to determine when the entire ten digit word is in and thus to commence a comparison. If the ADD THREE control element is off, entry of this digit sets the CURRENT POSITION register to +131 and turns on the ADD THREE flip-flop. The ADD THREE portion of the function simply provides for a margin against radial entrance error; that is, it provides that the phonograph arm, instead of being sent to the groove which is the proper address of the word entered, is sent to a groove which is three turns outside of that addressed groove. Since the phonograph turntable only turns in one direction, the motion imparted to the arm from the record when the arm is down and engaged in the groove is unidirectional. Thus, in order to insure that small errors in arm positioning do not result in the arm engaging the disk at a position further in than the address it is looking for, the arm is always sent to a position further out than the sought address. As will be seen, this is accomplished by performing the computation between the center position and the entered address position in such a way that the result is off by a fixed number of grooves. In this embodiment the number is nominally three grooves. Specifically, this is accomplished by inserting the information in the CURRENT POSITION register that the arm center position is at +131, when in fact, it is at +128.

As each digit is depressed, the code is entered into a forty bit recirculating KEYWORD STORAGE register (which is not shown on the flow diagram) and, when the digit counter condition reaches ten, representing ten digits having been entered, then the ENTER NUMBER control element is turned off, thereby inhibiting any further action by depression of any of the digit buttons.

Once the tenth digit has been entered a determination is made whether the keyboarded word passes the parity check. If it does not do so, then an element designated INPUT ERROR is actuated and the system is put back into the Ready Loop standby condition. If the parity check is correct, then an indicator is actuated which signals that the unit is in a CHECKING condition, the DRIVE control supplying power to the arm stepping motor is actuated and a DESIRED POSITION value equal to the address of the keyboarded ten digit word is supplied in the form of serial bit stream. The bit stream presented at this DESIRED POSITION terminal is compared with a bit stream generated from the CURRENT POSITION data register. It will be recalled that this CURRENT POSITION register had the address +131 entered into it. The comparison made is a dynamic one in which enough additional signals are generated to bring the bit stream for the current position into substantial identity with the bit stream for the desired position. These additionally generated signals are used to drive the stepping motor so that the arm and hence the stylus are driven to a position above a groove which is three turns outside of the groove identified by the keyboard address.

When this arm movement has been completed, an actuating signal is provided to turn on the arm up/down motor, as soon as a turntable sync signal has been received indicating that the magnetic reed switch has been actuated by the element on the turntable. The arm motor is driven downwardly until it reaches a lower limit switch and when that switch indicates that the arm is down the arm motor is turned off. At this point the stylus is engaged in the groove on the record which is intended to be three grooves outside of the address wherein the keyboarded entry, if it is listed, would be found.

The information on the disk is sensed by the stylus and decoded in the decoding circuit which provides both an output clock signal, indicating the bit positions in the signals read from the disk and the bit levels themselves. For the purpose of comparison, data is stored in an eight bit shift register as it comes from the decoder. The first determination made on the decoded stream of bits is whether or not a sync word has been detected. It will be recalled that there are five sync words per groove and that these provide the basis for identifying the initial bits of data words. Once a sync word has been identified, the LOAD CURRENT POSITION (LOAD CP) control element is turned on and the READ WORD (READ) control is adjusted. A determination is then made of the condition of the LOAD CP control. As will appear below this control will be on until a disk word has been read which passes parity check, and after that this control element will be off. When the LOAD CP is on, the disk address is entered into the CURRENT POSITION register and the parity of the entire disk word is computed. If the disk word parity computation indicates that the parity check fails, a determination is made if the word being checked is a fill word. If it is not a fill word then the READ WORD cycle is repeated. If the determination is made that it is a fill word, then a check is made to determine whether it is a sync word. If it is a sync word then the cycle is reactuated and if not then the entire loop keeps operating until a sync word does appear.

When a word on which the parity check is approved is read then the LOAD CP control element is turned off and the ADD THREE element is turned off. If the CALIBRATION flip-flop is off then the entire loop keeps operating thereby entering successive words from the data disk.

As each word is read a determination is made whether the address of the word from the disk, that is, the disk address is less than or greater than the keyboard address. If the disk address is smaller than the keyboard address, no action is taken on the word, and the comparison is made again on the next word read. If the disk address, at any time, is greater than the keyboard address and the word from the disk which carries this address provides a correct parity computation and the CALIBRATION flip-flop is off and the word is not a fill word, then a signal is provided indicating that the keyboard entered number is APPROVED, that is it is not listed on the disk. Similarly, if the disk address is not smaller than the keyboard address and not larger than the keyboard address, that is, if they are equal, and yet if the complete disk word is greater than the complete key word then again, provided that the parity check is met, the CALIBRATION flip-flop is off and it is not a fill word, a signal is provided that this keyboard entry word is APPROVED.

If, on the other hand, the disk address is the same as the keyboard address and the disk word is not smaller than the keyboard nor larger than the keyboard word, that is, when the keyboard word is the same as the disk word, then the signal is provided indicating that the keyboarded entry was LISTED, provided that the parity check is correct, the CALIBRATION flip-flop is off and the word is not a fill word.

When a word is either LISTED or APPROVED the system is instructed to stop reading, the CHECKING indicator is turned off and the arm updown motor is actuated to lift the stylus out of engagement with the data disk. When the arm motor is all the way up, the arm motor control is shut off and a level 128 signal is provided at the DESIRED POSITION terminal. The comparator system for equalizing the current position and the desired position is then actuated to step the drive motor until the CURRENT POSITION register is at +128 corresponding to the stylus being positioned over groove location 128. It should be noted that the amount of movement is determined by the difference between the 128 position and the current position loaded at the first word after the sync word which checks parity. The drive motor power is then turned off, as is the ADD THREE control element and the turntable motor and a +128 level is set and maintained in the CURRENT POSITION register. A this point the system is again in the Ready Loop and prepared for the next entry.

The calibration cycle takes place when a new disk is placed on the turntable and has for its purpose the precise positioning of the arm over the groove 128 on the data disk. If the system is in the Ready Loop and the continuity is broken, that is, if the cover is lifted then the CALIBRATION flip-flop is turned on and the drive motor and turntable motor are turned on. A −256 signal is provided to the DESIRED POSITION terminal. This causes the stepping motor to move the arm outwardly toward a position at −256, which would nominally be a spacing of 256 grooves outside of the outer disk position. As the arm moves away from the center of the groove beyond the limits of the data disk, it will strike and actuate a home switch, which is positioned at a distance approximately equivalent to a spacing of 128 grooves outside of the data disk. Once this switch has been actuated a −128 level signal is applied to and maintained in the CURRENT POSITION register and the turntable motor is turned off.

The system is now in condition where a new data disk may be substituted for the old since the phonograph arm is well away from the disk itself in its HOME position. Once the new disk has been placed on the spindle no further action takes place until the cover of the unit is closed thereby establishing continuity. Once continuity has been reestablished, the turntable motor is turned on again and a signal level of +128 is supplied to the DESIRED POSITION terminal. The DESIRED POSITION is then compared to the CURRENT POSITION register and used to count that register until the current position is the same as the DESIRED POSITION, in this instance +128. The signals used to perform this count, step the drive motor to move it 256 grooves from its HOME POSITION. It should now be reasonably close to being over the center groove of the data disk. At this point in the sequence, the next closing of the magnetic reed switch indicating a specific angular position of the turntable causes the arm motor to be actuated driving the arm motor down toward engagement with the disk and once the stylus is down and engaged the arm motor is turned off and the system commences its determination of whether a sync word has been detected.

When a sync word has been detected the LOAD CP control is actuated and the READ control is actuated. Then, as in the case of reading a word during the general comparison function, the CURRENT POSITION register is supplied with the actual disk address on the disk and, if disk word parity is achieved then the LOAD CP control and the ADD THREE flip-flop are turned off. Since the CALIBRATION flip-flop is on, the sequence now moves directly to turn off the READ control element and to drive the arm motor up. Once the arm motor is up, the arm motor power is turned off and the CALIBRATION flip-flop is turned off and a +128 level is supplied to the DESIRED POSITION terminal followed by a countdown to render the current position the same as the desired position. Thus if the actual current position established in moving from the off the disk HOME position is somewhat different from 128, the disk address read will differ from +128 and in this countdown after the turning off the arm motor and the CALIBRATION flip-flop the drive power will move the arm to a position precisely over the 128 groove. At this point the drive power and turntable power are turned off and the CURRENT POSITION register level is held at +128. The system is once again in Ready Loop and is now ready to start data comparisons.

The third function of the overall system is the normalization which takes place when the power is first applied. The application of the power actuates a SYSTEM NORMALIZE switch which turns all of the lights off, resets the START control element if it is on and resets the digit counter to zero as well as establishing the CURRENT POSITION level at +128. Having done this the calibration cycle is actuated and the calibration sequence will be followed as in the normal calibration situation.

This system also has a CLEAR control which permits the operator who enters a wrong digit to clear the device and start over. Actuation of the CLEAR pushbutton turns off all the lights and, if the CALIBRATION flip-flop is off it then initiates an end of cycle procedure which establishes that the arm is up, the arm motor is turned off, the CALIBRATION flip-flop is turned off and the arm itself is positioned at +128.

While all the functions have been described in terms of a specific embodiment of a data comparator, it will be realized that a number of these functions may be either changed or omitted, depending upon the specific system designed. For example, there may be a number of comparator situations in which it is unnecessary to check key word parity. Thus, the key word parity operations may be eliminated and, in a practical sense, a system may be designed so that this function can be added to or subtracted from the system simply by a relatively minor switching change or insertion of a printed circuit board.

THE DATA DECODING

Figure 7:
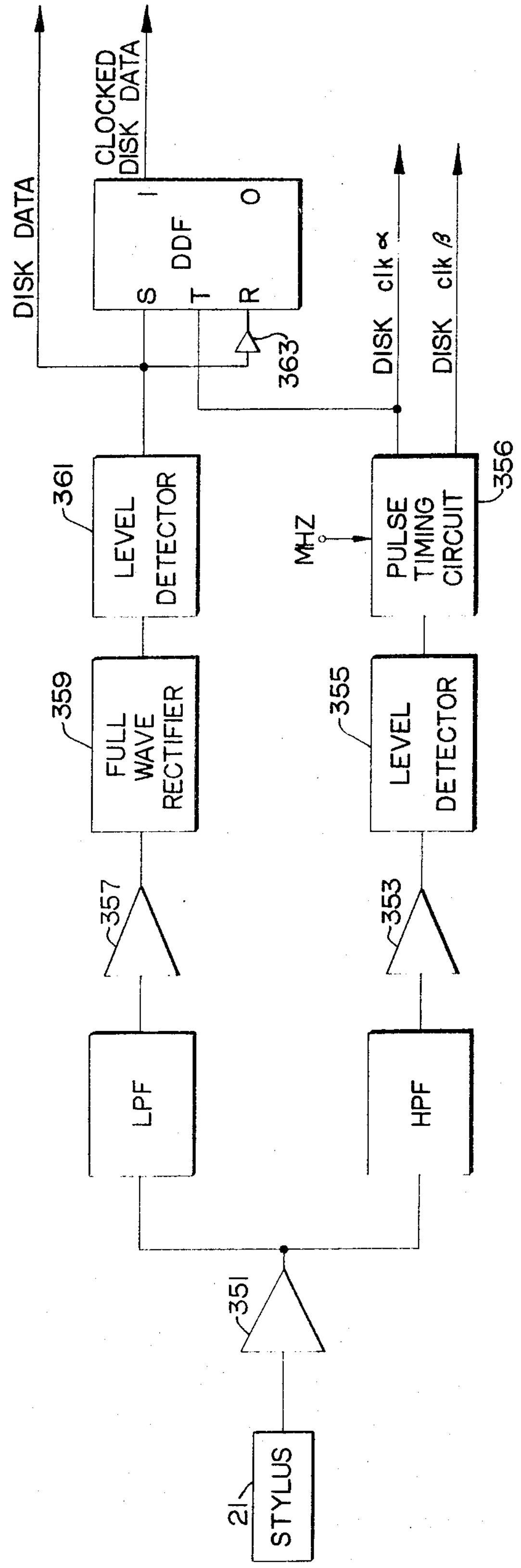
FIG. 7 is an illustration in block diagrammatic form of a data decoding system useful in the practice of this invention.

The apparatus for decoding the data from the disk is shown in block diagram form in FIG. 7. As shown in FIG. 7, the stylus 21 is connected through a conventional amplifier 351 to a low pass filter LPF and a high pass filter HPF. The high pass filter detects a clock train which is essentially recorded as a sine wave at the data rate, $F_D/2$. The low pass filter responds to data recorded in a train with an upper frequency limit of $F_D/2$. Such recording may be accomplished by various methods, but the preferred one is that disclosed and claimed in the copending application Ser. No. 788,441 filed on Jan. 2, 1969 by Allan Chertok for "Method and Apparatus for Storing Digital Data," and assigned to the assignee of this application.

The output of the high pass filter HPF is supplied through an amplifier 353 to a level detector 355 that produces an output each time the signal that has passed through the high pass filter HPF goes above a predetermined level with a selected Polarity. The result is a square wave signal which is applied to a pulse timing circuit 356. This circuit may be formed of a pair of megahertz triggered flip-flops and AND gates arranged such that two trains of narrow pulses are generated, one designated DISK CLK $\alpha$ and the other DISK CLK $\beta$, the latter pulses occurring halfway between the former. Both pulse trains are synchronized with a megahertz (MHz) clock signal produced by the logic circuitry. The DISK CLK $\alpha$ pulses serve as the basic clocking pulses for synchronizing the data bits, while the DISK CLK $\beta$ pulses are used to provide a time base for related logical operations, as will appear in the discussion below.

Figure 8:
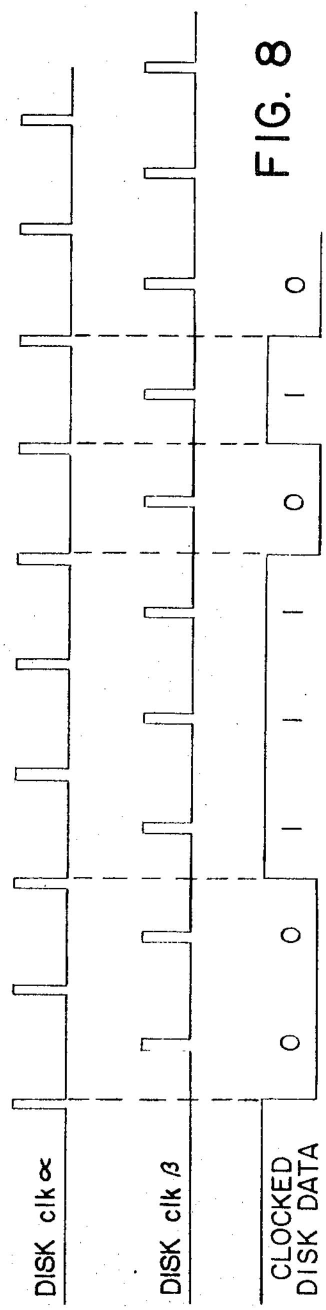
FIG. 8 is an illustration in graphical form of the pulse trains produced as an output from the decoding system of FIG. 7.

The low pass filter frequency discriminates against the clock train and passes the recorded data through an amplifier 357 to a full wave rectifier 359. The output of the full wave rectifier 359 is supplied to a second level detector 361. The output designated DISK DATA of the level detector 361 is applied directly to the set enable terminal of a synchronous flip-flop DDF, and through an inverter 363 to the reset enable terminal. The trigger terminal of the flip-flop DDF receives DISK CLK $\alpha$ pulses from the timing circuit 356. The state of the DDF is accordingly determined by whether the output of the level detector 361 is present or not present at the occurrence of each DISK CLK $\alpha$ pulse. FIG. 8 shows the output signal trains from the DDF for a logical signal 100111010, as well as the DISK CLK $\alpha$ and DISK CLK $\beta$ signal trains. The level detector 355 is set to respond to either the high or the low level signal to produce the train of clock pulses. The level detector 361 is set to respond only to the high level pulses, but to pulses of both polarities by reason of the full wave rectifier 359.

DESCRIPTION OF THE LOGIC IMPLEMENTATION

In a particular embodiment, the circuitry which is used to carry out the functional operations described in connection with FIGS. 5 and 6 may generally be considered as two different types of sub-systems. One type of sub-system comprises the operation units which perform the functions of addressing, comparing, storing, determining parity etc. The other type of sub-system consists of the programming units which control the overall sequence in which these functions are to be performed. In the description below the operational sub-systems will first be described and then the program sub-system.

As indicated previously in the description of the functional operations in connection with FIGS. 5 and 6, there are a number of comparisons that need to be made between data coming from the disk and data which has been stored somewhere within the electronic system. Additionally comparisons need to be made, from time to time, between digital information stored at two different places within the electronic system. Some of these comparisons involve 10 bit sequences and others involve forty bit sequences. In the embodiment to be described, the operational units for performing these comparisons do so on a serial bit basis. The digital information stored in the registers is used to generate a serial bit stream which is synchronized with the bits which are read serially from the data disk to enable a bit by bit comparison to be made. In the description of the decoding means for the information from the data disk, the basic timing signals associated with the disk data were described. In order to provide for synchronous operation of the electronics circuit and, in order to provide synchronism of the comparison between stored information in the electronics and stored information on the disk, two further sources of clock signals are included.

Figure 9:
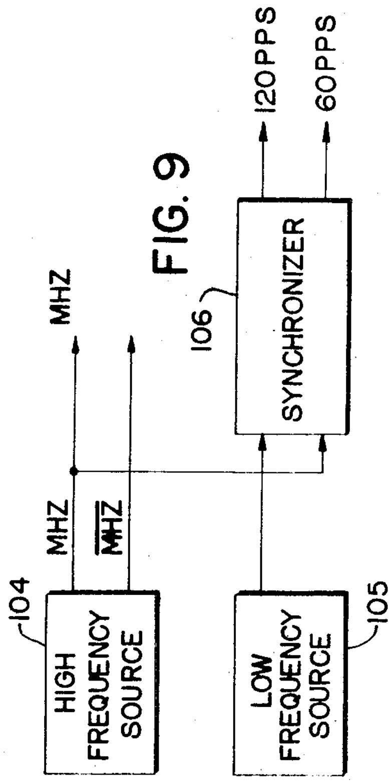
FIG. 9 is an illustration in block diagrammatic form of a system for generating clock pulses for use in the logic implementation of the verifying system of this invention.

In FIG. 9 there is illustrated the system for generating the internal clocking signals for the system. A high frequency source, 104 produces at a frequency of a few megahertz a square wave output and its logical complement called MHz, respectively, and a low frequency source 105 provides a square wave output at 60 hertz. The MHz signal from high frequency source 104 and the 60 hertz signal from the low frequency source 105 are both connected into a synchronizer unit 106 which provides a 120 pulse per second (120 PPS) output signal and a 60 pulse per second (60 PPS), output signal, each synchronized with the MHz output signal from the high frequency source 104. In addition, the MHz output signal from the high frequency source 104 is applied as an additional input to the pulse timing circuit 356 included in the data disk decoding circuit illustrated in FIG. 7. This MHz input to the timing circuit 356 provides that the DISK CLK $\alpha$ and DISK CLK $\beta$ output signals are precisely synchronized with respect to clocking pulses within the electronic system. In addition to these timing signals, the internal sequencing of the operational sub-systems to provide, for example, for generating a serial bit stream from a stored 40 bit word, requires some additional sequencing signals. The generation of signals to perform these internal sequencing functions will be described, as appropriate, in conjunction with the operational units they operate.

Figure 10:
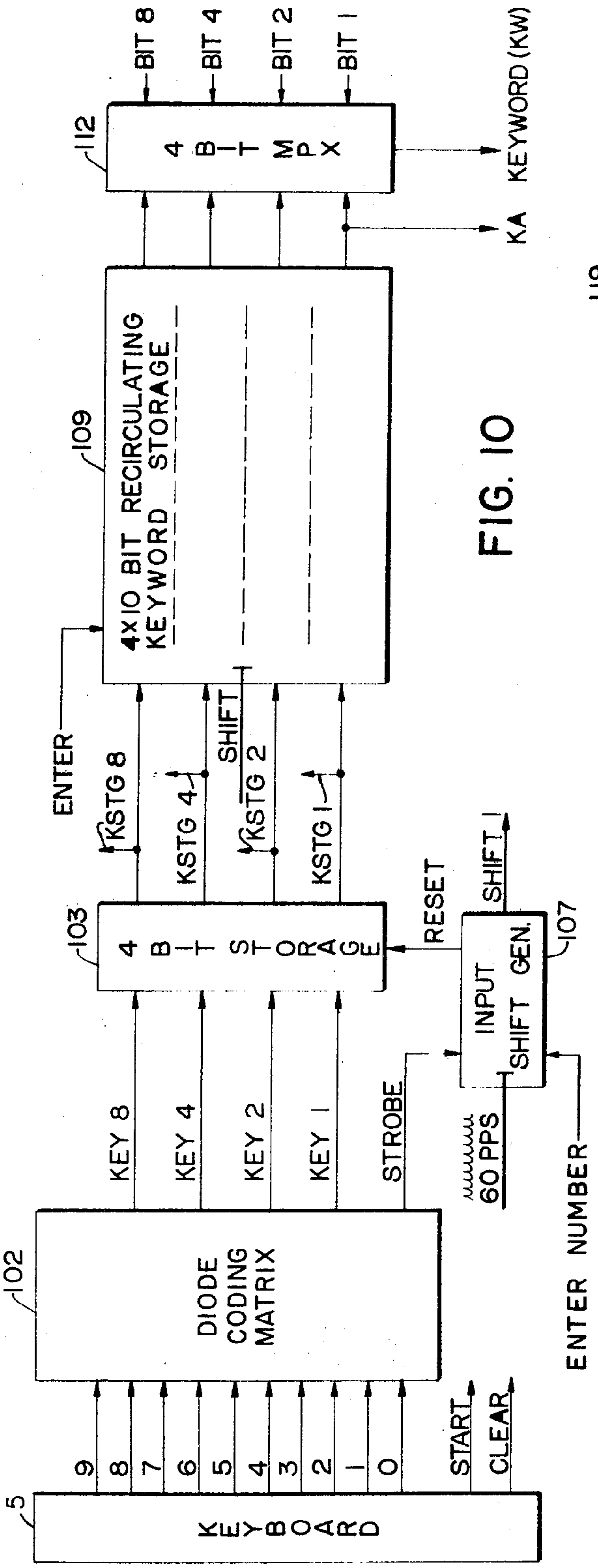
FIG. 10 is an illustration in block diagrammatic form of a keyboard storage sub-system useful in the practice of this invention.

With reference now specifically to FIG. 10 there is shown the logic for the keyboard entry sequence for entering ten, four bit words and storing them so they may be shifted out for comparison as a serial bit stream. The keyboard 5 carries 10 digit pushbuttons 23, each of which, when actuated, provides a four bit binary output code from the diode coding matrix 102. The keyboard also may be actuated to provide for generating a START signal and a CLEAR signal. As a keyboard digit pushbutton 23 is depressed, a four bit code is actuated from the output of the diode coding matrix 102 and presented as an input to a four bit storage element 103 which stores four bits in parallel. The actuation of any digit pushbutton 23 provides an input to shift generator 107.

The purpose of the input shift generator 107 is to generate shift and reset pulses to control the internal sequencing of the keyboard entry process. The input shift generator 107 is inhibited from action unless a signal from the ENTER NUMBER control element is provided indicating that the ENTER NUMBER control element is actuated. Thus, no SHIFT 1 pulses may be produced at any time when the ENTER NUMBER control element is disabled. A SHIFT 1 output pulse from generator 107 is provided each time, when the ENTER NUMBER is actuated, that a strobe level is received and followed by a pulse from the 60 PPS clock. After the SHIFT 1 pulse, a reset signal is provided to the four bit storage element 103 resetting that in preparation for the entry of the next digit.

The four bit outputs, designated KSTG1, KSTG2, KSTG4 and KSTG8, from the storage element 103 are provided as the input to a 40 bit recirculating KEYWORD STORAGE shift register 109, which consists of four 10 bit shift registers in parallel. When a signal from the ENTER NUMBER control element is present, as above, new data is entered into KEYWORD STORAGE 109 from the four bit storage 103 with each SHIFT pulse. Otherwise, the internal KEYWORD STORAGE data is recirculated. The signal for shifting the KEYWORD STORAGE unit 109 is any shift pulse. As will appear in more detail below, SHIFT pulses may be either SHIFT 1, SHIFT 2 or SHIFT 3 pulses. During the keyboard entry process only SHIFT 1 pulses produced by the input shift generator 107 are operative. The output from this recirculating KEYWORD STORAGE unit 109 is provided to a four bit multiplexer unit 112 which is sequenced by a number of input leads designated BIT 8, BIT 4, BIT 2 and BIT 1. By sequentially actuating each one of these bit input leads the four bit signal stored in a multiplexer 112 is serially shifted out on a keyword (KW) output lead for comparison to data disk signals. The least significant bit, bit 1 output is provided directly on a key address (KA) output lead also.

Figure 11:
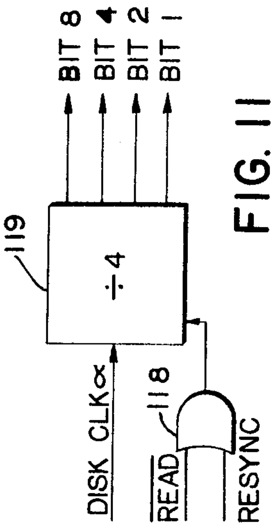
FIG. 11 is an illustration in block diagrammatic form of a divider sub-system useful in the logic implementation of the verifying system of this invention.

The elements for generating these bit input lead signals are shown in FIG. 11. The DISK CLK $\alpha$ data disk signals are connected as an input to a divide-by-four counter 119 which produces sequences to the next output signals on each clock signal. This unit also has a reset to BIT 8 on a signal from OR gate 118 which is applied whereever there is a resynchronization or whenever the program does not call for reading out the data words.

Figure 12:
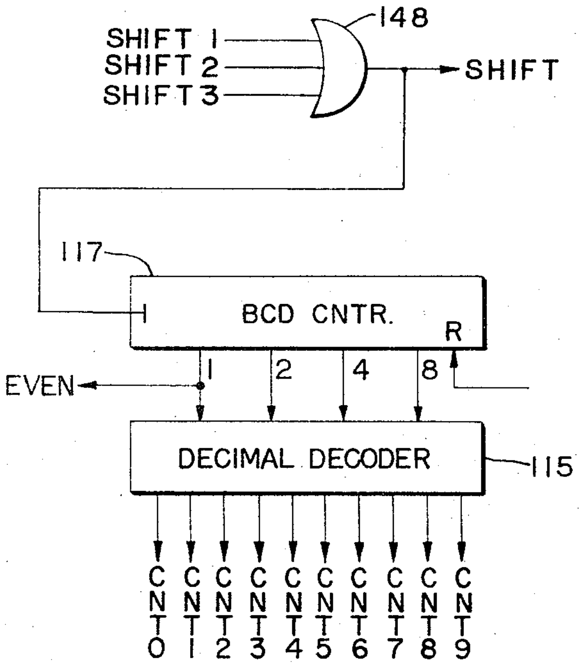
FIG. 12 is an illustration in block diagrammatic form of a counting sub-system useful in the logic implementation of this invention.

In FIG. 12 the OR gate 148 which produces the generalized shift signal is shown. This OR gate 148 has as its inputs, SHIFT 1, SHIFT 2 and SHIFT 3 signals. Consequently, whenever any one of the three types of shift signals are generated a SHIFT output is provided. As noted above, SHIFT 1 signals are generated during keyboard entry. The generation of SHIFT 2 and SHIFT 3 signals for arm position control and data comparison, will be explained below. The SHIFT pulses are applied to the recirculating KEYWORD STORAGE 109 during the data entry process and are applied to the BCD counter 117 where their number is accumulated. The binary outputs of BCD counter 117 are applied to the decimal decoder 115, one of whose individual decimal outputs is energized. An additional output is provided from the first one of the BCD counter 117 binary outputs to indicate whether the number is odd or even.

Figure 13:
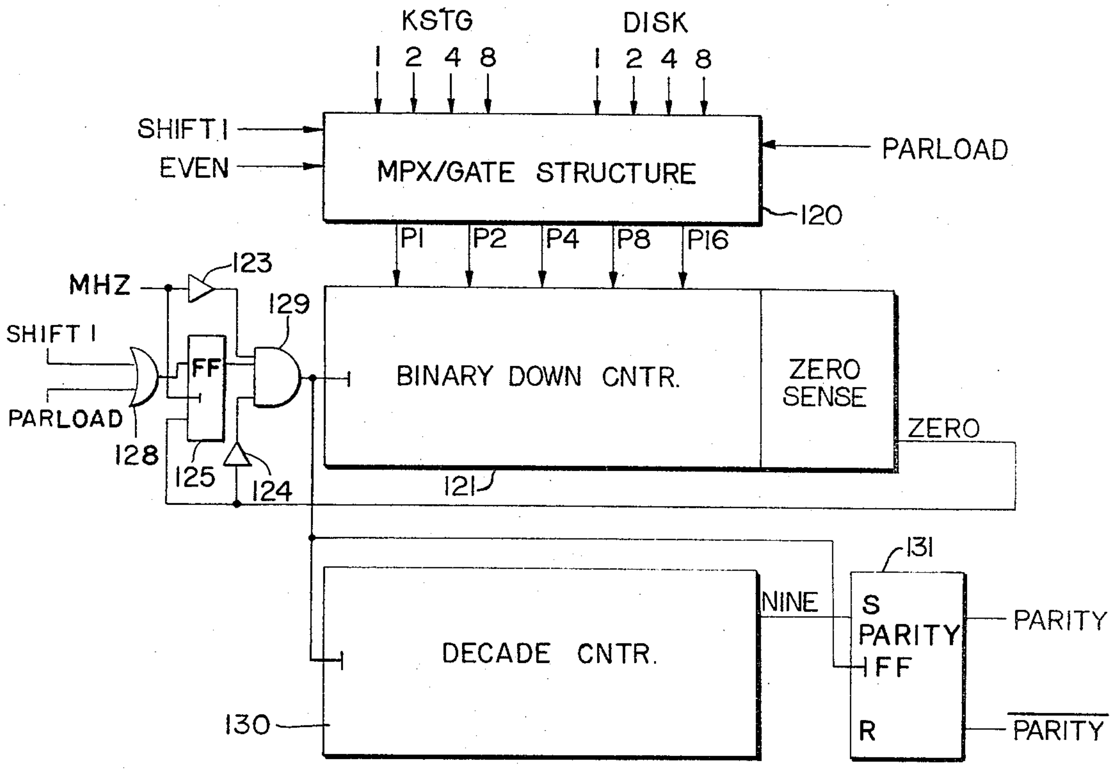
FIG. 13 is an illustration in block diagrammatic form of a parity computation sub-system used in the practice of this invention.

FIG. 13 is an illustration in block diagrammatic form of a parity check out circuit. The parity computation is based on a parity arrangement whereby each of the numbers in the odd digit locations 1, 3, 5, 7 and 9 are doubled; for each such doubled number comprising more than one numeral, the numerals are summed; and these modified doubled numbers are added to the numbers in digit locations 2, 4, 6, 8 and 10 using module 10 addition. For valid parity this total should result in a zero value.

In FIG. 13 this parity computation is implemented for keyboard entered numbers by applying the keyboard storage bits, KSTG1, KSTG2, KSTG4, and KSTG8 and they appear at the output of the storage element 103 in the keyboard entry sub-system, to a multiplexing gate structure 120. These bits are shifted out in parallel form into a binary down counter 121 in response to shift 1 pulses applied to the multiplexing gate structure. The signal level from the EVEN output of the digit entry counter illustrated in FIG. 12, indicates to the multiplexing gate structure 120 whether or not the digit being processed is even or odd. When the digit being processed is even the gate structure doubles the value of the number entered into the down counter 121 and if the resultant value is 10 or more, an additional one is added on line P1. Whenever the binary down counter 121 contains a zero, a ZERO signal is fed back to the reset input of a flip-flop unit 125 which is clocked from the MHz clock signal and which has its set input actuated from OR gate 128, the latter having as inputs the SHIFT 1 signal and a PARLOAD signal. The PARLOAD signal, as will be explained, provides the actuating signal for checking the parity of words as they are read from the disk. When there is an output from OR gate 128 and no ZERO signal from the zero sense output of the binary down counter 121, the next positive half of that MHz signal sets flip-flop 125 actuating the set output, which is connected as one input lead to AND gate 129. The other inputs to AND gate 129 are the inverted 124 value of the ZERO sense signal and MHz, the inverted 123 or negative half of the MHz signal. Therefore, when the set output is actuated, each MHz pulse produces an input actuating pulse to the binary down counter 121 until a count of zero is reached. The number of such pulses required to produce the zero condition is equal to the value of the number entered from the gate structure 120. Each one of these input actuating pulses is also applied to the input of the decade counter 130. The nine output from decade counter 130 is supplied to the set input of parity flip-flop 131 which receives the input actuating pulses directly as its trigger signals. The outputs from this flip-flop are PARITY and $\overline{\text{PARITY}}$. Thus the PARITY flip-flop outputs are actuated each time the decade counter 130 reaches a count of zero, module ten. This PARITY signal is only utilized, however, when it occurs in conjunction with the tenth digit signal from the digit counter. This occurrence indicates that the parity computation for the 10 digit number is valid.

Figure 14:
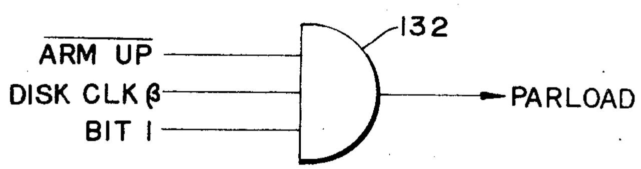
FIG. 14 is an illustration in block diagrammatic form of a logic arrangement for generating a sequencing signal useful in conjunction with the parity computation system of FIG. 13.
Figure 20:
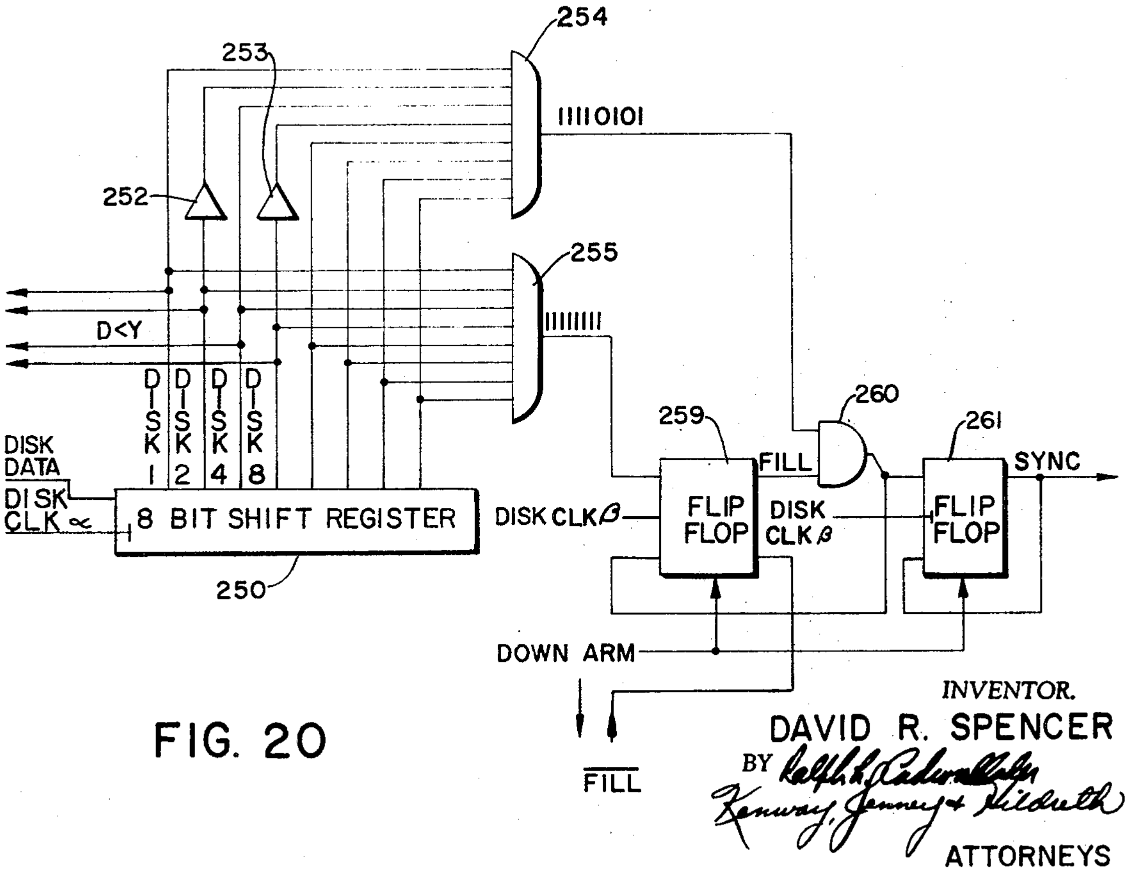
FIG. 20 is an illustration in block diagrammatic form of a shift register and comparator sub-system used in the logic implementation of the verifying system of the invention.

When the parity computation is being carried out on data from the disk the SHIFT 1 signal function is performed by the PARLOAD signal. As shown in FIG. 14, the PARLOAD signal is generated by an AND gate 132 which has inputs of $\overline{\text{ARMUP}}$, indicating the stylus arm is engaged in the data disk groove, BIT 1 and DISK CLK $\beta$. Since the clocking pulse is DISK CLK$\beta$, while the actuating pulse for data comparison is DISK CLK $\alpha$, the parity computation can be completed before the comparison is to be made. For this parity computation the multiplexing inputs to the gate structure 120 are the first four bits from the eight bit shift register 250 to which the disk data is supplied (FIG. 20).

Figures 17, 18:
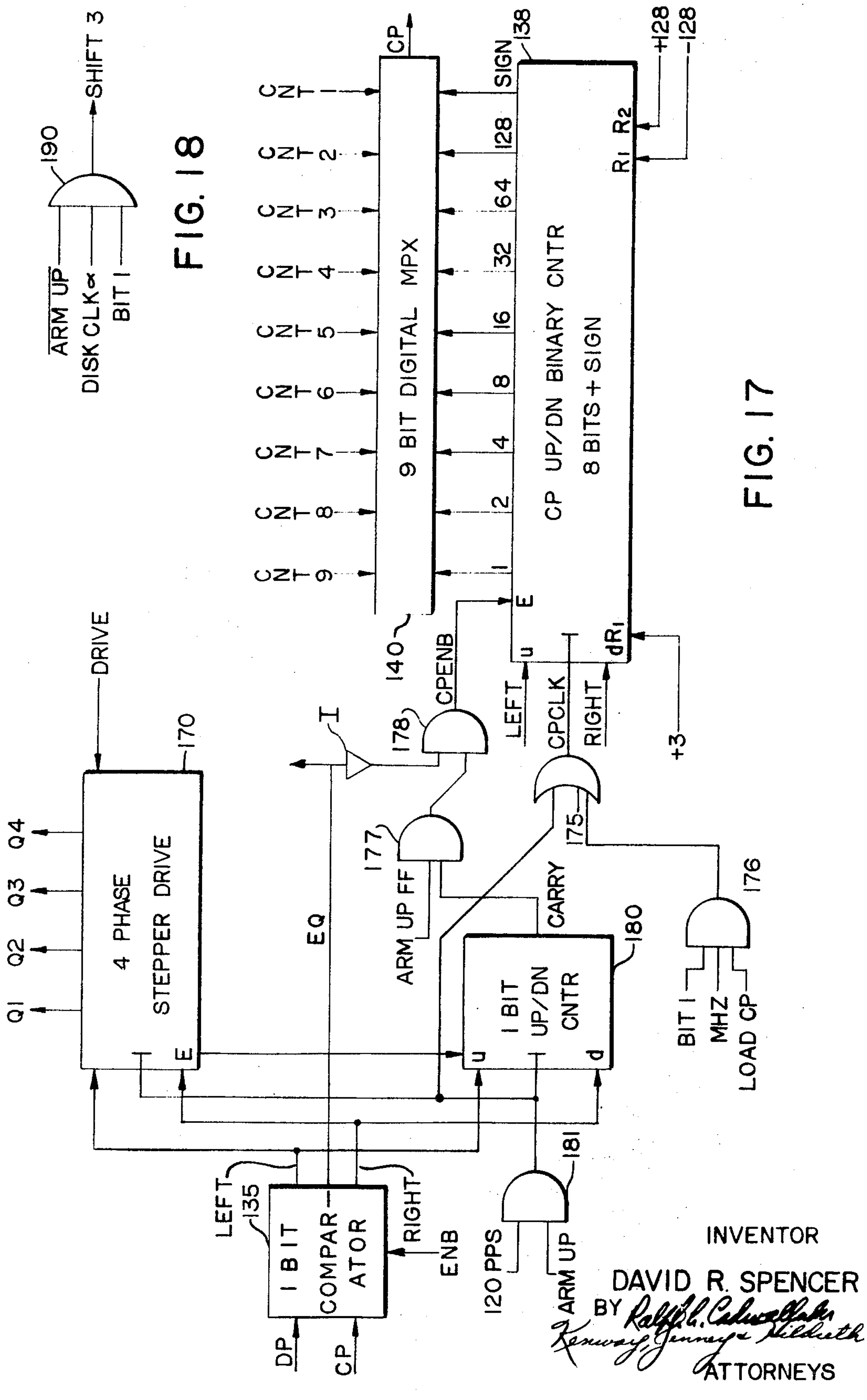
FIG. 17 is an illustration in block diagrammatic form of an address arm control sub-system useful in the practice of the invention.
FIG. 18 is an illustration in block diagrammatic form of a logic unit for producing a control pulse useful in the logic implementation of the verifying system of the invention.

In FIG. 17 there are illustrated the units which form the address control sub-system to perform the function of moving the phonograph arm carrying the stylus to the appropriate desired position. The operation is performed by comparing, one bit at a time, a sequence of bits representing the desired position of the arm to a sequence of bits representing the current position of the arm. This comparison is carried out in a 1 bit comparator 135 which has for inputs the desired position (DP), the current position bits (CP) and a reset lead (ENB). The outputs provided are LEFT, RIGHT, and EQ. No outputs are provided unless the ENB signal (FIG. 17) is present. The EQ output is provided whenever there is an equality between the DP input and the CP input. Otherwise, depending upon the direction of the inequality, either a LEFT or a RIGHT output signal is provided. The CP bits are generated from the up-down binary counter 138 and nine bit digital multiplexer 140 illustrated in FIG. 17, while the DP bit stream is generated by the series of gates illustrated in FIG. 16.

Figure 15:
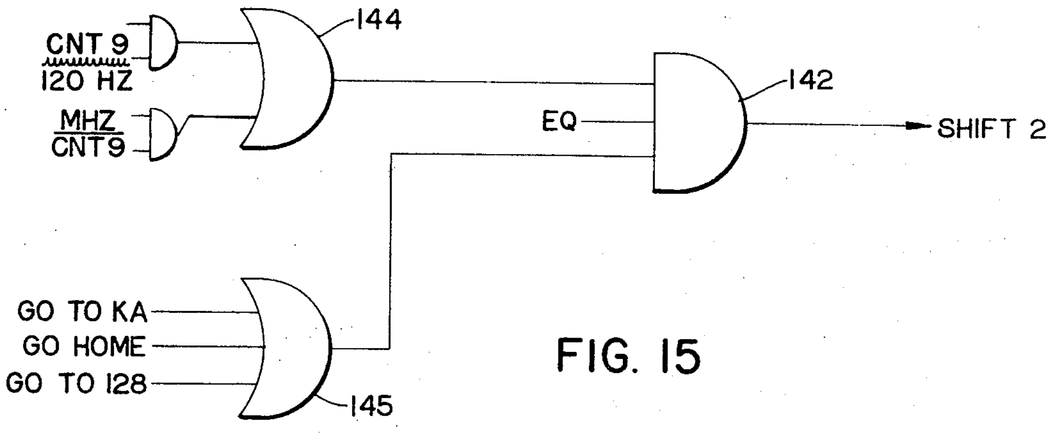
FIG. 15 is an illustration in block diagrammatic form of an arrangement of logic elements to produce sequencing signals useful in the logic implementation of the verifying system of this invention.

The nine bit digit multiplexer 140 illustrated in FIG. 17 is actuated sequentially by the CNT 0 through CNT 9 outputs from decimal decoder 115 shown in FIG. 12 which, in turn, is actuated by the BCD counter 117 in response to applied SHIFT pulses. In the addressing control operation, the shift pulses applied to the counter 117 are SHIFT 2 pulses generated as shown in FIG. 15. The SHIFT 2 pulses are produced by an AND gate 142 which has three inputs. One of these inputs is the EQ output from the one bit comparator 135, one input is from an OR gate 144 which has as one input a combination of a CNT 9 output AND the 120 HZ signal and as the alternative input a combination of the MHZ signal AND a CNT 9 condition. The third input to the AND gate 142 is from a second OR gate 145 which responds either to a GO TO KA signal, a GO HOME signal or a GO TO 128 signal. The latter three conditions are those which control the addressing operation of the arm. SHIFT 2 pulses are therefore produced whenever there is an equality from the one bit comparator 135, coupled with one of the address control instructions. These shift signals are produced at a MHZ rate, except during CNT 9.

Figure 16:
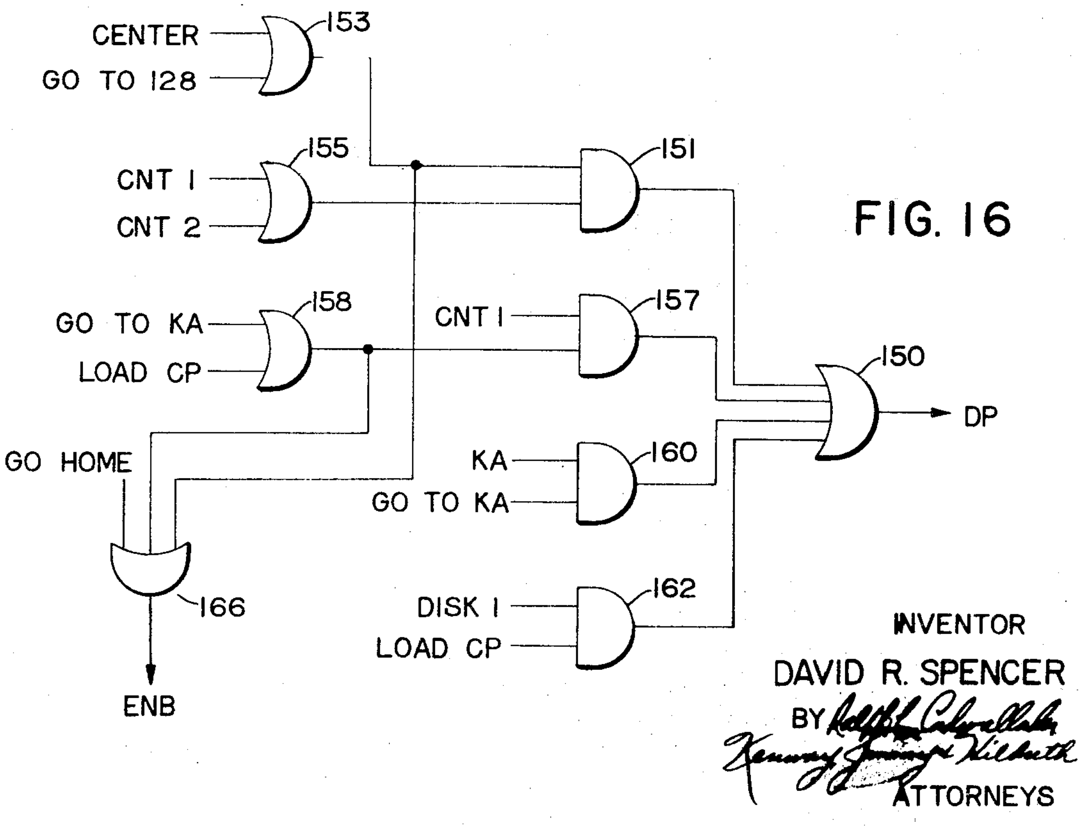
FIG. 16 is an illustration in block diagrammatic form of a sub-system useful in the practice of this invention in conjunction with the address arm control sub-system illustrated in FIG. 17.

The series of gates controlling the DP bit stream are illustrated in FIG. 16. The DP signal is generated at the output of OR gate 150 which has four different alternative input leads. One input lead is from AND gate 151 which has the outputs of OR gates 153 and 155 as its inputs. OR gate 153 has alternative inputs of a CENTER signal and a GO TO 128 signal, while OR gate 155 has alternative inputs of CNT 1 or CNT 2. When either GO TO 128 or CENTER and CNT 1 or CNT 2 appear, AND gate 151 produces an output which becomes the DP signal. The second alternative input lead to OR gate 150 comes from AND gate 157 which has on one input a CNT 1 signal and the other input is actuated by the output of OR gate 158, the latter having on one input a GO TO KA signal and on the other a LOAD CP signal. Thus when the instruction is either GO TO KA or LOAD CP in conjunction with a CNT 1 signal, this becomes the DP output signal. A third input is applied from AND gate 160 which has as one input a GO TO KA signal and the other the keyboard address (KA) output from the storage register 109. When the instruction is GO TO KA the lowest order bit from each successive digit stored in the recirculating storage 109 is provided as the DP output. The fourth alternative input lead to OR gate 150 is the output of AND gate 162 which is actuated by an input from DISK 1 in conjunction with a LOAD CP instruction. When the LOAD CP instruction is actuated the lowest order bits on the data disk are provided as the DP output.

The DP output signal for the centering operation in which the arm is positioned above groove 128 is controlled by AND gate 151, the OR gate 155 providing successively the plus sign signal and the value 128 signal. The addressing operation in which the arm is moved to the keyboard address position is controlled by AND gates 157 and 160. AND gate 157 provides the sign signal for both the keyboard addressing operation and the LOAD CP operation. The procedure in which the current position of the arm is loaded into the register is controlled by AND gate 162.

The enabling signal ENB for the one bit comparator 135 is produced by OR gate 166 which has as alternative inputs the GO HOME instruction, the GO TO KA or the LOAD CP instruction, or the CENTER or the GO TO 128 instruction. Therefore, whenever any instruction indicating that the arm should move is present or alternatively that the current position should be loaded into be CP register, the comparator 135 is enabled.

The overall operation then of the addressing control is an operation in which the LEFT and RIGHT signals from the comparator 135 both drive the four phase stepper motor 170 which controls the lateral position of the phonograph arm and also actuate the count of the CP counter 138 which contains the information as to where the arm is. The count is sequenced by the BCD counter 117 operated by SHIFT 2 pulses and the decimal decoder 115, illustrated in FIG. 12.

The up-down binary counter 138 which holds eight bits plus sign, is clocked from an OR gate 175 which has as one input the output of an AND gate 176 which combines inputs from BIT 1, MHZ and LOAD CP. This AND gate is operative when the LOAD CP instruction is present to drive the up-down counter 138 with the megahertz signals occurring in conjunction with the BIT 1 output from the DIVIDE BY FOUR counter 119 (shown in FIG. 11). The LEFT and RIGHT output signals from the comparator of FIG. 17 are also applied as controlling input signals to the up-down counter 138 in FIG. 17, the LEFT signal controlling the counter to count in the up direction while the RIGHT signal controls it to count in the down direction. Upon receipt of the appropriate programming instruction, pulses are supplied to the up-down counter 138 and to the stepping motor until the current position (CP), as indicated by the status of the up-down counter, for each count position is equal to that of the desired position (DP). At this point, the arm is in the desired position and the stepping motor comes to rest. For normalization and voice suppression, signals are impressed directly on the appropriate stages of counter 138.

Figure 19:
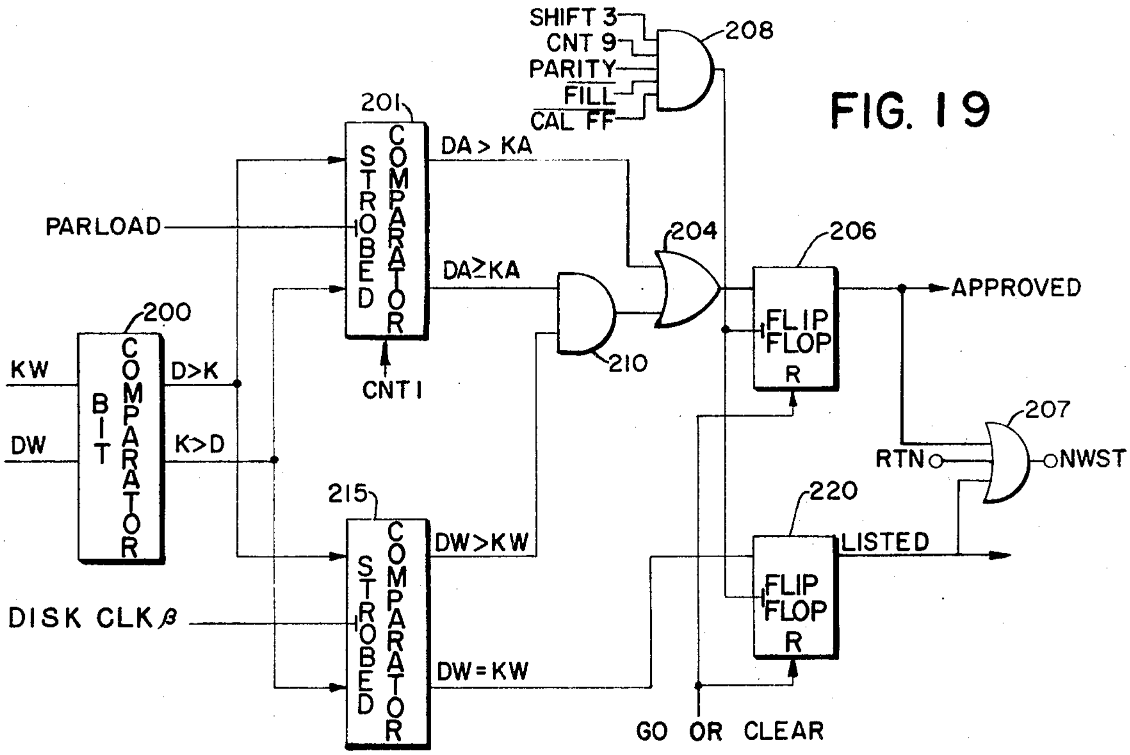
FIG. 19 is an illustration in block diagrammatic form of a comparator sub-system used in the practice of the invention.

In FIG. 19 there is illustrated the basic comparator arrangement for determining if the keyboard entry is in fact listed on the data disk. This sub-system operates when the stylus arm is down and after it has been sent to a disk address approximately three less than the right address. To perform the comparison, the bit stream coming from the multiplexer 112 at the output of the recirculating keyboard storage unit 109, must be synchronized with the bit stream coming off the data disk. This synchronization is provided by using as the shift signal for the storage unit 109, the SHIFT 3 signal. The generation of the SHIFT 3 signal is illustrated in FIG. 18. The SHIFT 3 signal is the output from AND gate 190 which has as inputs $\overline{\text{ARM UP}}$, that is the arm being down and engaged in the groove, the DISK CLK $\alpha$ signal and a BIT 1 signal. BIT 1 is the least significant bit and therefore the next four bits of each word in the keyboard storage unit 109 are shifted into the multiplexing unit 112 each time four bits are read from the data disk.

The sub-system for determining whether or not a keyboarded entry is listed operates on a sequence which first determines whether the disk address (DA) is equal to or greater than the keyboard address (KA). If the DA is greater than the KA an immediate APPROVED signal is provided. If the DA is greater than or equal to the KA an approved signal is provided only if the disk word (DW) is greater than the keyboard word (KW). A LISTED output signal is provided only if the DW is actually equal to the KW.

The KW and the DW are provided as serial bit stream inputs to bit comparator 200 which provides two output signals, one indicating that the bit on the disk is greater than the bit on the keyboard (D > K), the other indicating that the bit on the keyboard input is greater than the bit on the disk word input (K > D). The D > K and K > D outputs are supplied to strobe comparator units 201 and 215. The clocking signal for strobe comparator 201 is the PARLOAD signal, which, it will be recalled, is generated essentially in synchronism with DISK CLK $\beta$ and only during BIT 1. Thus the strobed comparator 201 provides an output only for the least significant bit. It is held reset to the end of CNT 1 and therefore represents a comparison of the eight address bits. The second strobe comparator 215 is triggered directly by DISK CLK $\beta$ and thus is strobed on every bit from the data disk. As soon as a bit inequality is sensed the comparison is held until the next word starts. Since the bit stream is read from the disk in the order of most significant bit first, then the first bit inequality indicates that, in fact, the entire word pair is correspondingly unequal. One output from the the strobe comparator 201 is actuated when the disk address is greater than the keyboard address (DA > KA). This output is coupled through OR gate 204 directly to the set enable input of the flip-flop 206 and when DA is greater than KA, the next triggering pulse to flip-flop 206 provides an APPROVED output signal, indicating that the keyboarded word is not listed on the data disk. The other output from the strobe comparator 201 is actuated when the disk address is greater than or equal to keyboard address (DA≥ KA). This signal is provided as one input to AND gate 210. One output from the second strobe comparator 215 is actuated when the disk word is greater than the key word (DW > KW). This output is provided as a second input lead to AND gate 210, the output of which is connected through OR gate 204 to the flip-flop 206 and generates an APPROVED signal. The second output from the strobe comparator 215 designates that the disk word is equal to the key word ($DW = KW$). This output is energized when neither one of the outputs from the bit comparator 200 are energized for any bit in the word pair, therefore corresponding to the two input words being identical. This output is provided to the set enable input of flip-flop 220, and when DW = KW, the next trigger pulse from AND gate 208 provides a LISTED output signal indicating that the keyboarded word is listed on the data disk. The triggering signal for both flip-flops 206 and 220 comes from AND gate 208 and represents a conjunction of a SHIFT 3 signal, and CNT 9 signal, a PARITY signal, a lack of either a signal indicating that the word is a fill word or that the word has been generated during calibration. The triggering signal is therefore generated at the end of each data word from the data disk. Thus if either flip-flop 206 or 220 has its set input energized when this trigger signal occurs then either an APPROVED or a LISTED output will be provided.

The APPROVED and LISTED outputs from flip-flops 206 and 220 are connected as inputs to OR gate 207 which provide as an output a program control signal NWST, to indicate completion of the comparison cycle. A RTN signal is also coupled to one input of OR gate 207. This signal is generated at the conclusion of a calibration cycle.

In FIG. 20 there is illustrated in block diagrammatic form the sub-system for determining whether the system is reading a sync word from the data disk. It will be recalled that the sync word consists of forty eight bits of which the first eight are in the 1 state and the last eight form the code 11110101. In order for the sync word to be recognizable as such and perform its function of indicating bits of a data word, the sync word must be at least forty bits long, since that is the length of the data words, and must be formulated to be distinguishable from them. In addition there must be sufficient additional bits to provide noise immunity, so that if one or more bits are missed somewhere in the sensing system the sync word may still be recognized and used to either synchronize or resynchronize the system. In the sub-system of FIG. 20, the disk data is provided as an input to an eight bit shift register 250, which is clocked by the DISK CLK $\alpha$ signals. The shift register has eight individual output leads coming from each bit position and the first four of these are designated DISK 1, DISK 2, DISK 4 and DISK 8 and these are provided as separate output signals. It will be recalled, for example, that DISK 1 in conjunction with a LOAD CP control signal is an actuating signal for the DP terminal. All eight of the bit position signals from shift register 250 are connected as inputs to AND gate 255. This AND gate has the function of recognizing a fill word and/or the start of a sync word, and if all eight inputs are in the 1 state a set signal is provided to flip-flop 259, which, when triggered by a DISK CLK $\beta$ clocking signal with this set input generates an output signal indicating a fill word.

All eight of the bit position signal leads are also provided to a second AND gate 254. However, the leads from disk 2 and disk 8 are connected through inverters 252 and 253 respectively to the AND gate 254 so that this AND gate provides an output signal in response to a series of pulses 11110101. The output from the AND gate 254 is connected to the second input of AND gate 260 so that a fill word followed by the 11110101 configuration results in AND gate 260 providing an output signal to the set input of a second flip-flop 261, which is also clocked by disk clock data. The control signal to the set input of flip-flop 261 followed by the disk clock $\beta$ signal results in producing a sync output word on the data disk.

PROGRAM SUB-SYSTEM

Figure 21:
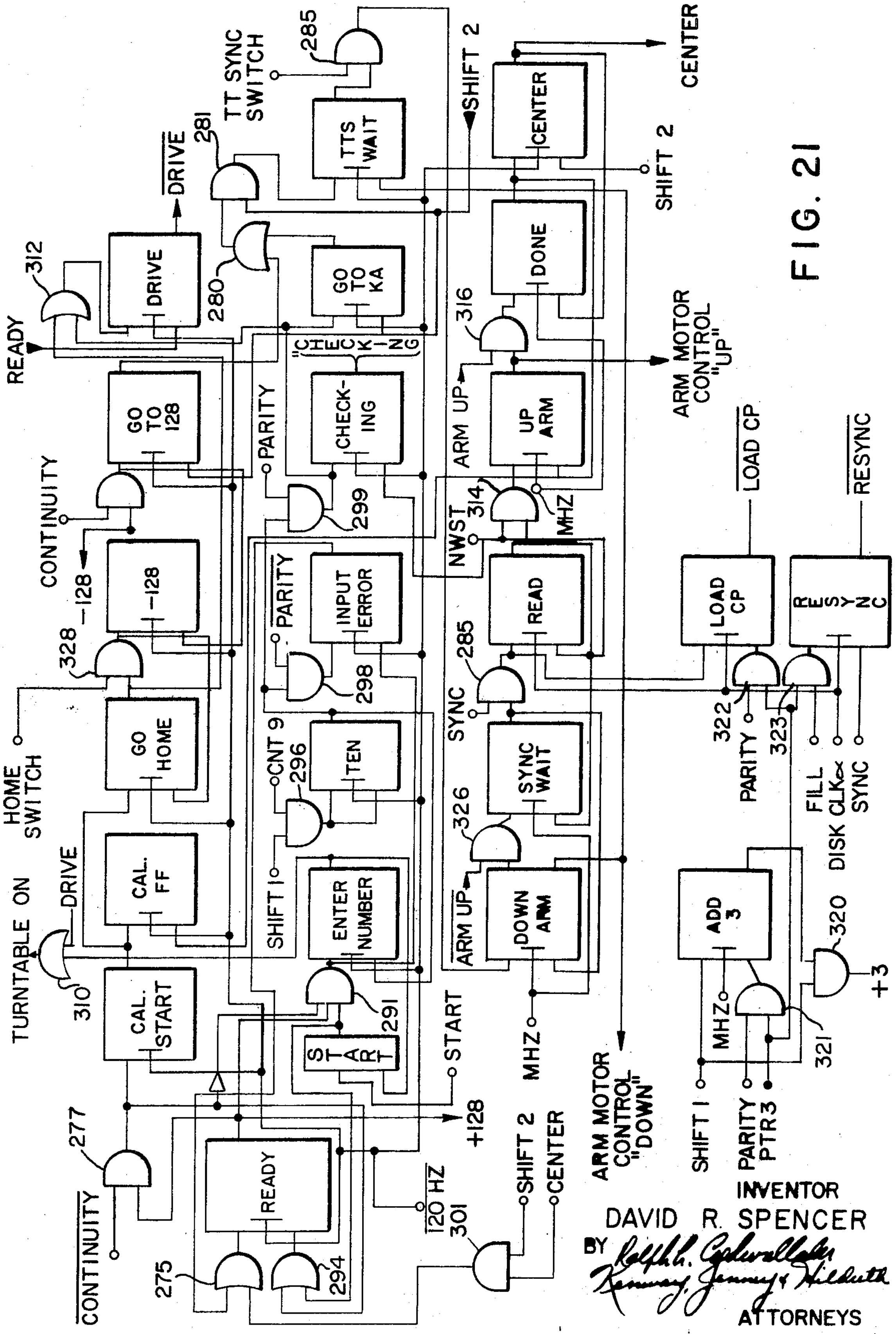
FIG. 21 is an illustration in block diagrammatic form of a programming system for controlling the sequence of operation of the sub-systems used in the logic implementation of this invention.

The sub-systems described above perform the indicated operations of the data comparator system as generally described in conjunction with the functional flow chart of FIGS. 5 and 6. The programming arrangement to control the sequence in which these operational sub-systems are activated to perform their functions is illustrated in FIG. 21. As there is shown the programming is generally controlled by a series of interconnected flip-flop units in conjunction with AND gates. The flip-flops are of a type which have set enable, reset enable and trigger inputs and set and reset outputs. When the set enable input is actuated the next trigger pulse will actuate set output, irrespective of the condition of the reset input. When the reset enable input is actuated, the next trigger pulse will actuate the reset output. In the following description the pulse timing of the trigger signals has not been described, but FIG. 21 illustrates the source of these signals. In general the names on the flip-flop units identify the control functions they perform, as described in the functional description. Thus the READY Loop includes the READY flip-flop, which is turned on through OR gate 275 either by an output from the INPUT ERROR flip-flop or by a conjunction of the SHIFT 2 signal, a CENTER signal, and a 120 Hz. trigger. The conjunction of the READY flip-flop being in its set condition with a signal indicating no continuity operates through AND gate 277 to turn on the CAL START flip-flop thereby turning the turntable motor on through OR gate 310 and actuating the CAL flip-flop. A set output from the CAL START flip-flop also provides an actuating signal to the GO HOME flip-flop. The output from the GO HOME flip-flop actuates the DRIVE flip-flop through OR gate 312 and in conjunction with an actuation from the home switch (indicating the arm has moved entirely off the turntable), actuates the −128 flip-flop generating a −128 output signal. So long as the −128 flip-flop is actuated and provided that the continuity switch is closed, the GO TO 128 control flip-flop is actuated and this output is coupled through OR gate 280 to AND gate 281 controlling the status of the Turntable Sync Wait flip-flop (TTS Wait Flip-Flop). The second actuating input to the AND gate 281 is from SHIFT 2 actuating the TTS Wait flip-flop on coincidence of a SHIFT 2 pulse, the 120 Hz signal and an output from OR gate 280. When the TTS Wait flip-flop is actuated and there is an output from the turntable sync switch, this provides an actuating signal to the DOWN ARM flip-flop through AND gate 285, thereby initiating a Read cycle.

The Read cycle may also be initiated from the Ready Loop if continuity is present by pressing the START pushbutton 25, thereby actuating the START flip-flop. The set output of the START flip-flop in conjunction with the set output of the READY flip-flop and the inverted output of AND gate 277, indicating the the presence of continuity in the Ready Loop, are presented to AND gate 291, whose output is used to actuate the ENTER NUMBER flip-flop. Once the ENTER NUMBER flip-flop is on it remains on until it is turned off by an actuation of the TEN flip-flop which occurs when there is a conjunction of a SHIFT 1 signal and a CNT 9 signal on AND gate 296. The TEN flip-flop, therefore, is turned on after ten digit entries have been made and once this flip-flop is actuated a signal is provided to AND gate 298 and to AND gate 299. If there is $\overline{\text{PARITY}}$ output, indicating that the ten digits do not meet the parity computation, the INPUT ERROR flip-flop is actuated through AND gate 298 returning the system to the ready condition. If, on the other hand, there is an indication of valid parity then the CHECKING flip-flop is actuated through AND gate 299 providing an output indication that the system is checking and the GO TO KA (go to keyboard address) flip-flop is actuated. The output from the GO TO KA flip-flop acts through OR gate 280 and AND gate 281 as above, to energize the TTS WAIT flip-flop again initiating a Read cycle. It should be noted that when the ENTER NUMBER flip-flop is first turned on, the initial SHIFT 1 pulse provides a 3 output pulse which provides for the current position register to be at 131, rather than 128, and then turns on the ADD 3 flip-flop.

Once the Read cycle has been initiated, it will continue until the provision of an NWST output signal from the data comparator circuit, indicating that a keyboarded number has either been LISTED or APPROVED or that a calibration cycle has been completed. This NWST signal will reset the CHECKING flip-flop, thereby extinguishing the corresponding indication, and, in conjunction with the actuated state of the READ flip-flop, will energize the UP ARM flip-flop through AND gate 314. This flip-flop drives the arm raising and lowering motor in the up direction and, once this arm is up, energizes the DONE flip-flop through AND gate 316. The actuation of the DONE flip-flop results in the actuation of the CENTER flip-flop to provide a centering output signal to return the position of the stylus arm to the center position over the data disk, thereby ending the cycle and returning the system through AND gate 301 to the ready condition.

Immediately after the first sync word has been found on the data disk, the LOAD Current Position cycle is initiated by actuation of the LOAD CP flip-flop at the same time that the READ flip-flop is actuated. The LOAD CP flip-flop is reset on the coincidence of a valid PARITY signal and PTR3, which indicates the end of a 40 bit disk word sequence.

A RESYNC flip-flop is included and, this Resync provides for the synchronizing of the digital logic to the 40 bit sequence coming from the data disk when a sync word, after the initial one, has been read out from the data disk. It will be recalled that there are several (typically five) sync words for each groove on the data disk and, if the usual search time involves three grooves, then perhaps fifteen sync words will be read from the disk. Since each sync word contains an extra eight bits over the 40 bit data words, the resync operation is necessary to maintain the system in synchronism. However, if disk word synchronism has been lost, a resynchronism will be effected.

There has been no description of the system normalization program. It will be understood that this can readily be accomplished by providing separate actuating signals to set the program elements in the correct initial positions and thence to commence a calibration cycle.

It will be understood that the system described above is a preferred embodiment and that many of the specific program and sub-system arrangements may be modified or replaced with other systems to perform generally the same functions.

I claim:

1. A data comparison system comprising, data entry means for entering a specific digital signal sequence to be compared into said system;

a data register for storing said entered digital signal sequence;

a phonograph for reproducing a train of signals representing digital sequences recorded in a predetermined order in a continuous spiral track on a phonograph record;

comparator means coupled to said data register and said phonograph for comparing the contents of said data register with signals recorded on a record and producing an output signal indicating whether there is recorded on the phonograph record a train of signals representing the specific digital sequence entered into said data register, said train of signals on said phonograph being ordered in 2 groups of words, each of said groups including those words in which the N least significant bits are identical and wherein the order of the sequence of words within each group is natural order based on all of the bits in each word.

2. A data comparison system in accordance with claim 1 wherein said phonograph comprises;

an arm carrying a readout head;

a turntable for rotating a phonograph record;

means for mounting said arm for translational movement relative to a record on said turntable and for vertical movement between a first position engaging a record on said turntable for reproducing data from the record and a second position out of engagement with the record on said turntable;

means to control said arm in its second position for translating the arm to a position just outside that portion of a record on said turntable corresponding to the location of the group of words identified by the N least significant bits of the specific digital signal sequence stored in said data register, and means responsive to the translated position of said arm and said data register for moving the arm to its first position when it is in a translated position adjacent to said portion of the record on said turntable.

3. A data comparison system in accordance with claim 1 and further including a phonograph record on which a list of P digit decimal numbers is serially recorded as binary coded decimal digit words, said list being recorded in an ordered sequence in groups of words, each word in a group having the same value in a subset of its bits, said subset comprising the lowest order bits of a portion of its digits, the words within said groups being recorded in a sequence determined by the values of said words.

4. A data comparison system for determining whether a specific P-digit number is included in a list of numbers, said list being stored in binary code on a spiral track of a phonograph record in an ordered sequence, said ordered sequence being such that the P-digit numbers are stored in groups, each of the P-digit numbers stored in any group having the identical value for specific selected bit positions as all of the other numbers in said group, said P-digit numbers being arranged within groups in natural order, comprising, data entry means for entering a specific digital sequence to be compared into said system;

a data register for storing an entered digital signal sequence representing said P-digit number;

a phonograph for reproducing a train of signals representing the stored P-digit numbers from said record, said phonograph including a readout head for sensing the signals on said spiral track and positioning means for controlling the position of said readout head with respect to a record on said phonograph;

a comparator coupled to said readout head and to said storage register for comparing the contents of said storage register with signals sensed by said readout head and for producing an output signal indicating whether the signals received from said phonograph represent the same digital sequence that has been entered into said data register, and control means for controlling said positioning means to position said readout head in a normal ready position above a portion of said record identified by a specific sequence of bit position values identifying a specific group, said control means being responsive to the entry of an P-digit number into said data register to move said readout head from said ready position to a position just outside of the location of the group within which said entered number would be included and to operatively engage said readout head with said record at this position.

5. A data comparison system in accordance with claim 4 wherein said control means positions said readout head, in response to an entered number, above a portion of the record corresponding to a group location three groups farther out than that group within which said entered number should lie.

6. A data comparison system for determining whether a specific Pedigit number is included in a list of numbers, said list being stored in binary code on a spiral track of a phonograph record in an ordered sequence, said ordered sequence being such that the P-digit numbers are stored in groups, each of the P-digit numbers stored in any group having the identical value for specific selected bit positions as all of the other numbers in said group, said P-digit numbers being arranged within groups in natural order, comprising, data entry means for entering a specific digital sequence to be compared into said system;

a data register for storing an entered digital signal sequence representing said P-digit number;

a phonograph for reproducing a train of signals representing the stored P-digit numbers from said record, said phonograph including a readout head for sensing the signals on said spiral track and positioning means for controlling the position of said readout head with respect to a record on said phonograph;

a comparator coupled to said readout head and to said storage register for comparing the contents of said storage register with signals sensed by said readout head and for producing an output signal indicating whether the signals received from said phonograph represent the same digital sequence that has been entered into said data register, and control means for controlling said positioning means to position said readout head in a normal ready position above a portion of said record identified by a specific sequence of bit position values identifying a specific group, said control means being responsive to the entry of an P-digit number into said data register to move said readout head from said ready position to a position just outside of the location of the group within which said entered number would be included and to operatively engage said readout head with said record at this position, wherein said comparator means provides a first type of output signal when a signal sequence representing a P-digit number precisely corresponding to the P-digit number entered into said data register is read from said record and providing a second type of output signal when said readout head senses signals from the group within which said entered P-digit number would lie representing a number beyond said digit number in the natural order in which said numbers are arranged within the groups.

7. A data comparison system for determining whether a specific P-digit number is included in a list of numbers, said list being stored in binary code on a spiral track of a phonograph record in an ordered sequence, said ordered sequence being such that the P-digit numbers are stored in groups, each of the P-digit numbers stored in any group having the identical value for specific selected bit positions as all of the other numbers in said group, said P-digit numbers being arranged within groups in natural order, comprising, data entry means for entering a specific digital sequence to be compared into said system;

a data register for storing an entered digital signal sequence representing said P-digit number;

a phonograph for reproducing a train of signals representing the stored P-digit numbers from said record, said phonograph including a readout head for sensing the signals on said spiral track and positioning means for controlling the position of said readout head with respect to a record on said phonograph;

a comparator coupled to said readout head and to said storage register for comparing the contents of said storage register with signals sensed by said readout head and for producing an output signal indicating whether the signals received from said phonograph represent the same digital sequence that has been entered into said data register, and control means for controlling said positioning means to position said readout head in a normal ready position above a portion of said record identified by a specific sequence of bit position values identifying a specific group, said control means being responsive to the entry of an P-digit number into said data register to move said readout head from said ready position to a position just outside of the location of the group within which said entered number would be included and to operatively engage said readout head with said record at this position, wherein said comparator provides a first type of output signal when a signal sequence representing a P-digit number precisely corresponding to the P-digit number entered into said data register is read from said record and providing a second type of output signal when said readout head senses signal from a group which lies closer to the center of said record in the ordered sequence of groups than the group within which said entered P-digit number would lie.

8. A data comparison system in accordance with claim 6 wherein said control means is operative upon the generation by said comparator means of either said first type or said second type of output signal to disengage said readout head from said record and to return said readout head to said normal ready position.

9. A data comparison system in accordance with claim 8 wherein said control means includes a position register, said position register having entered therein, when said readout head is in the ready position, a series of bit values corresponding to those bit values identifying the group on the record which is immediately below the ready position of said readout head.

10. A data comparison system in accordance with claim 9 wherein said readout head upon sensing the first complete P-digit number after engagement with said record, enters the values of a selected bit position identifying the group within which said number lies into said position register to provide a basis for precisely repositioning said readout head at said normal ready position upon completion of the data comparison function for the entered P-digit number.

11. A data comparison system in accordance with claim 10 wherein said record includes within each group of recorded numbers a sequence of signals of predetermined format to serve as a synchronization word, whereby said data comparator is actuated to perform its comparison function commencing with the first bit of a recorded P-digit number.

12. A data comparison system in accordance with claim 11 and further including programming means for sequentially controlling said data comparison system to: immediately after the entry of the $P^{th}$ digit into said data register, move said readout head to a position just outside of the portion of the record within which said P-digit number would be recorded;

next, cause said readout head to operatively engage said record and inhibit said system for entering any data into said position register or comparing any data within said data comparator until after said readout head has sensed a synchronization word, and thereafter enter the group identifying bits of the first P-digit number sensed into said position register and continue to enter P-digit numbers into said data comparator for comparison against the P-digit number entered into said data register until either said first or said second type of output signals are produced;

then, upon one of said output signals being produced, cause said readout head to disengage from said record and return to its ready position, and change the information in said position register to again identify said ready position.

13. A data comparison system in accordance with claim 9 wherein said data register is formed as a 4 by P bit recirculating shift register; said shift register being operated, upon entry of a complete P-digit number, to generate a serial bit stream of those bit position values identifying the group within which said entered number would lie, for comparison to the bit values within said position register to generate control signals to actuate said control means.

14. A data comparison system in accordance with claim 13 wherein said data register is again operated, after said readout head has operatively engaged said record, to generate a serial bit stream of all the bit position values for comparison to the serial bit stream that said readout head senses from said record.

15. A data comparison system in accordance with claim 4 wherein the digits within said listed P-digit numbers each have a value, such that for any listed number, employing said values in a predetermined computation results in a specific arithmetic value for the computation and wherein said comparator provides its output signal only after said predetermined computation has been performed using the sensed digital signals and said computation has produced said specific arithmetic value.

16. A data comparison system in accordance with claim 15 wherein said control means only moves said readout head away from its ready position after said predetermined computation has been performed on the specific P-digit number entered into said data register and the computation has produced said specific arithmetic value.

17. A data comparison system for determining whether a specific P-digit number is included in a list of numbers, said list being stored in binary code on a spiral track of a phonograph record in an ordered sequence, said ordered sequence being such that the P-digit numbers are stored in groups, each of the P-digit numbers stored in any group having the identical value for specific selected bit positions as all of the other numbers in said group, said P-digit numbers being arranged within groups in natural order, comprising, data entry means for entering a specific digital sequence to be compared into said system;

a data register for storing an entered digital signal sequence representing said P-digit number;

a phonograph for reproducing a train of signals representing the stored P-digit numbers from said record, said phonograph including a readout head for sensing the signals on said spiral track and positioning means for controlling the position of said readout head with respect to a record on said phonograph;

a comparator coupled to said readout head and to said storage register for comparing the contents of said storage register with signals sensed by said readout head and for producing an output signal indicating whether the signals received from said phonograph represent the same digital sequence that has been entered into said data register, and control means for controlling said positioning means to position said readout head in a normal ready position above a portion of said record identified by a specific sequence of bit position values identifying a specific group, said control means being responsive to the entry of an P-digit number into said data register to move said readout head from said ready position to a position just outside of the location of the group within which said entered number would be included and to operatively engage said readout head with said record at this position and wherein the digits within said listed P-digit numbers each have a value, such that for any listed number, employing said values in a predetermined computation results in a specific arithmetic value for the computation and wherein said comparator provides its output signal only after said predetermined computation has been performed using the sensed digital signals and said computation has produced said specific arithmetic value, and including a decoding means operative on the output of said readout head to produce a first train of signals representing stored P-digit numbers, a second train of signals constituted of a series of pulses having a fixed relation to the location of binary bits in said first signal train and a third train of signals constituted of a series of pulses spaced between pulses in said second signal train, pulses from said second signal train being used to actuate said computation and pulses from said third signal train being used to actuate the output from said comparator.

18. A data comparison system in accordance with claim 9 wherein the digits within said listed P-digit numbers each have a value such that, for any listed number, employing said values in a predetermined computation results in a specific arithmetic value for the computation and wherein said group identifying bits are entered into said position register only after said predetermined computation has been performed using the sensed digital signals and said computation has produced said specific arithmetic value.

19. A data comparison system in accordance with claim 11 wherein the digits within said listed P-digit numbers each have a value such that, for any listed number, employing said values in a predetermined computation results in a specific arithmetic value for the computation and wherein said readout head is moved after entry of the $P^{th}$ digit only when said predetermined computation has been performed on said entered P-digit number and resulted in said specific arithmetic value and further wherein said sensed P-digit number has its identifying bits entered into said position register only after said predetermined computation has been performed on said sensed P-digit number and resulted in said specific arithmetic value.

* * * * *

PO-1050
(5/69)

UNITED STATES PATENT OFFICE
CERTIFICATE OF CORRECTION

Patent No. 3,662,340 Dated May 9, 1972

Inventor(s) DAVID R. SPENCER

It is certified that error appears in the above-identified patent and that said Letters Patent are hereby corrected as shown below:

Column 5, line 34, delete "cation" and insert --cations 1, 3, 5, 7 and 9, with the result of these computations, when combined, providing a specific digit for the ten digit. Thus, if any data word, either from the data disk or entered in from the keyboard or any other data entry means, fails to meet a parity test, there has been an error somewhere and the overall comparison operation is not performed with respect to that word.

FUNCTIONAL OPERATION OF THE DATA COMPARATOR SYSTEM--.

Column 6, line 19 capitalize "continuity"; line 22 capitalize "start".
Column 16, line 65, delete "the", first occurrence.
Column 17, line 10, before "3" insert --+--; line 11 before "131" insert --+--; line 12 before "128" insert --+--; and line 74 delete "2" and insert --$2^N$--.
Column 19, line 2, delete "Pedigit" and insert --P-digit--.

Signed and sealed this 24th day of April 1973.

(SEAL)
Attest:

EDWARD M. FLETCHER, JR.
Attesting Officer

ROBERT GOTTSCHALK
Commissioner of Patents